(12) United States Patent
Kubota et al.

(10) Patent No.: US 10,351,722 B2
(45) Date of Patent: Jul. 16, 2019

(54) NON-AQUEOUS INK JET COMPOSITION

(71) Applicant: Seiko Epson Corporation, Tokyo (JP)

(72) Inventors: Kenichiro Kubota, Matsumoto (JP); Naoki Koike, Matsumoto (JP); Jun Ito, Shimosuwa (JP); Shugo Hattori, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/185,430

(22) Filed: Nov. 9, 2018

(65) Prior Publication Data

US 2019/0077979 A1 Mar. 14, 2019

Related U.S. Application Data

(62) Division of application No. 15/414,982, filed on Jan. 25, 2017, now Pat. No. 10,208,219.

(30) Foreign Application Priority Data

Jan. 27, 2016 (JP) ................................ 2016-013478
Jan. 27, 2016 (JP) ................................ 2016-013527

(51) Int. Cl.
| | | |
|---|---|---|
| C09D 11/36 | (2014.01) | |
| C09D 11/38 | (2014.01) | |
| C09D 11/322 | (2014.01) | |
| C09D 11/106 | (2014.01) | |
| C09D 11/037 | (2014.01) | |
| C09D 11/033 | (2014.01) | |
| B41J 2/01 | (2006.01) | |

(52) U.S. Cl.
CPC ............... *C09D 11/36* (2013.01); *B41J 2/01* (2013.01); *C09D 11/033* (2013.01); *C09D 11/037* (2013.01); *C09D 11/106* (2013.01); *C09D 11/322* (2013.01); *C09D 11/38* (2013.01)

(58) Field of Classification Search
CPC ..... C09D 11/36; C09D 11/033; C09D 11/037; C09D 11/106; C09D 11/38; C09D 11/322; B41J 2/01
See application file for complete search history.

(56) References Cited

U.S. PATENT DOCUMENTS 8,991,996 B2 3/2015 Nagase et al.
9,193,882 B2 11/2015 Aruga et al.
(Continued)

FOREIGN PATENT DOCUMENTS

EP 1 790 698 A1 5/2007
EP 1 857 510 A1 11/2007
(Continued)

OTHER PUBLICATIONS

IP.com search (Year: 2018).*
Partial European Search Report for Patent Application No. EP17153616.2 dated May 11, 2017 (12 pages).
(Continued)

*Primary Examiner* — Lisa Solomon
(74) *Attorney, Agent, or Firm* — Harness, Dickey & Pierce, P.L.C.

(57) ABSTRACT

A non-aqueous ink jet composition includes a pigment component containing a diketopyrrolopyrrole pigment and an organic solvent. The organic solvent contains glycol ethers. The amount of dissolved nitrogen in the non-aqueous ink jet composition is 90 mass ppm or less based on the total amount of the non-aqueous ink jet composition.

7 Claims, 1 Drawing Sheet

(56) References Cited

U.S. PATENT DOCUMENTS

| | | |
|---|---|---|
| 9,650,529 B2 | 5/2017 | Murai et al. |
| 2004/0066438 A1 | 4/2004 | Taguchi et al. |
| 2007/0120920 A1 | 5/2007 | Taguchi et al. |
| 2008/0166655 A1 | 7/2008 | Ogata et al. |
| 2008/0173214 A1 | 7/2008 | Oyanagi et al. |
| 2010/0083875 A1 | 4/2010 | Nakao |
| 2015/0184011 A1* | 7/2015 | Shimura ............... B41J 2/1631 347/21 |
| 2016/0168405 A1 | 6/2016 | Ito et al. |
| 2016/0222229 A1 | 8/2016 | Yamada et al. |
| 2016/0237291 A1 | 8/2016 | Nagase et al. |
| 2016/0264805 A1 | 9/2016 | Nagase et al. |

FOREIGN PATENT DOCUMENTS

| | | |
|---|---|---|
| EP | 2 105 476 A2 | 9/2009 |
| JP | 2004-352917 A | 12/2004 |
| JP | 2006-243588 A | 9/2006 |
| JP | 2007-177190 A | 7/2007 |
| JP | 2008-233314 A | 10/2008 |
| JP | 2013-177597 A | 9/2013 |
| JP | 2014-091795 A | 5/2014 |
| JP | 2014-237803 A | 12/2014 |
| JP | 2016-113531 A | 6/2016 |
| JP | 2016-150985 A | 8/2016 |
| JP | 2016-166311 A | 9/2016 |

OTHER PUBLICATIONS

Extended European Search Report for Application No. Ep 17 15 3616 dated Sep. 14, 2017 (14 pages).
IP.com search.

* cited by examiner

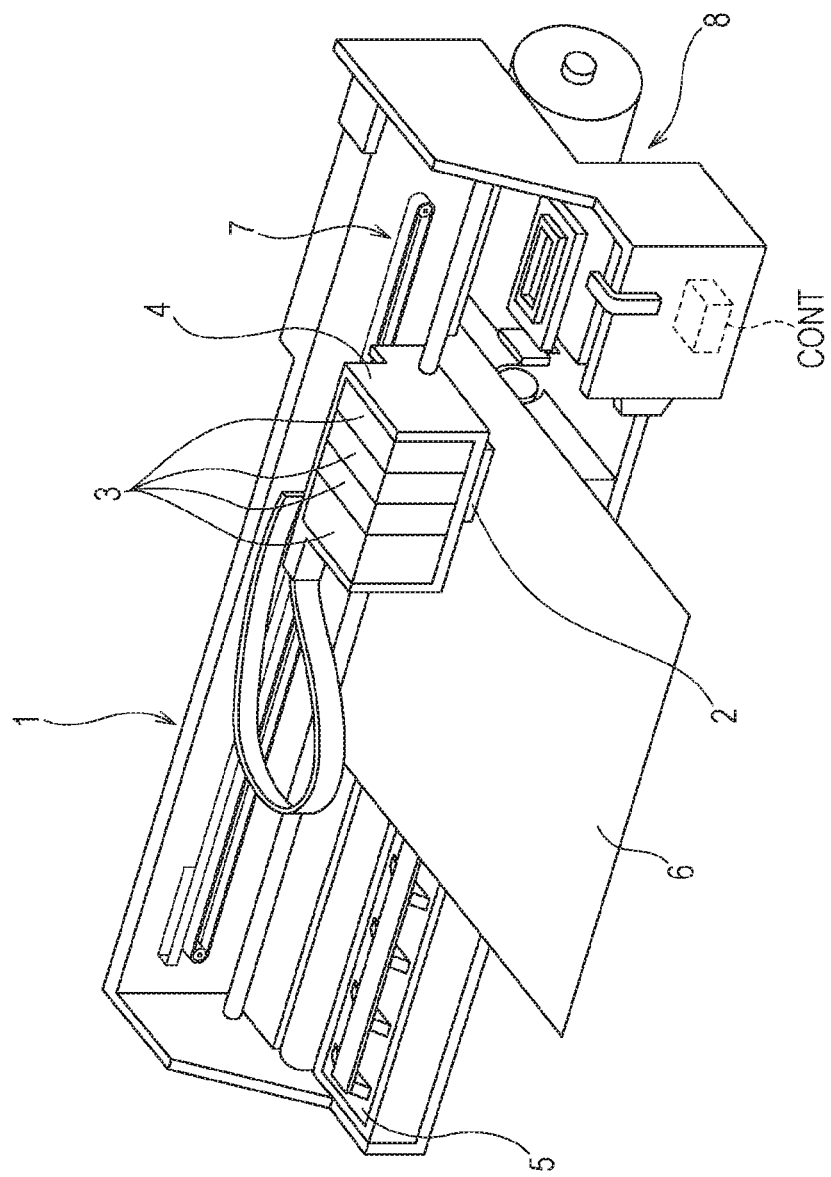

NON-AQUEOUS INK JET COMPOSITION

CROSS-REFERENCE TO RELATED APPLICATIONS

This application is a divisional of U.S. patent application Ser. No. 15/414,982, filed Jan. 25, 2017, which claims priority to Japanese Patent Application No. 2016-013478, filed Jan. 27, 2016, and Japanese Patent Application No. 2016-013527, filed Jan. 27, 2016, all of which are hereby expressly incorporated by reference herein in their entireties.

BACKGROUND

1. Technical Field

The present invention relates to a non-aqueous ink jet composition.

2. Related Art

Ink jet recording methods can record highly fine images with relatively simple apparatuses and have been rapidly developing in various fields. Among them, various studies for more stably giving recorded matters having high quality have been being carried out.

For example, JP-A-2014-91795 is subjected to provide an ink exhibiting excellent discharge stability and discloses an ink for ink jet printing containing water, a water-soluble organic sorbent, a coloring material, and an polyol that is dissolved in water in an amount of 10 wt % or less in a standard state (25°, 1 at.) and having a weight ratio of the dissolved nitrogen concentration to the dissolved oxygen concentration of 10/1 or more.

For example, JP-A-2009-227812 is subjected to provide, in particular, an oil-based ink set having high color reproducibility and providing images having high color intensity and discloses an oil-based ink set including a first oil-based ink, a second oil-based ink, and a third oil-based ink each independently having a wavelength region in which the reflectivity on a recording medium changes from 80% to 5% within a wavelength region range of 400 to 700 nm, wherein the reflectivity of the second oil-based ink is successively higher than that of the first oil-based ink in the wavelength region in which the reflectivity of the first oil-based ink changes from 80% to 5%; the reflectivity of the third oil-based ink is successively higher than that of the second oil-based ink in the wavelength region in which the reflectivity of the second oil-based ink changes from 80% to 5%; and the coloring materials in the first oil-based ink, the second oil-based ink, and the third oil-based ink are different from one another.

However, the ink for ink jet printing described in JP-A-2014-91795 is an aqueous ink jet composition containing water and is not any non-aqueous ink jet composition substantially not containing water. Aqueous ink compositions and non-aqueous ink jet compositions differ from each other in required characteristics and physical properties and raw materials necessary for the characteristics.

Known non-aqueous ink jet compositions can include pigment components containing diketopyrrolopyrrole pigments for improving the intensity of the resulting recorded matters. However, the pigments contained in the compositions cause uneven aggregation in the resulting recorded matters, resulting in poor intensity of the recorded matters. In addition, non-aqueous ink jet compositions are required to provide recorded matters having excellent intensity and at least have excellent discharge stability.

The oil-based ink described in JP-A-2009-227812 contains a pigment having an average particle diameter larger than a prescribed value, resulting in poor storage stability.

SUMMARY

An advantage of some aspects of the invention is to provide a non-aqueous ink jet composition that has excellent discharge stability and can form recorded matters having excellent intensity.

The present inventors have diligently studied to solve the above-described problems and, as a result, have found that a non-aqueous ink jet composition including a pigment component at least containing a diketopyrrolopyrrole pigment and a prescribed organic solvent and having a dissolved nitrogen content not higher than a predetermined amount has excellent discharge stability and can form recorded matters having excellent intensity, and have accomplished the present invention.

That is, a first aspect of the present invention relates to a non-aqueous ink jet composition including a pigment component containing a diketopyrrolopyrrole pigment and an organic solvent. The organic solvent contains glycol ethers, and the amount of dissolved nitrogen in the organic solvent is 90 mass ppm or less based on the total amount of the non-aqueous ink jet composition. The factors of such a non-aqueous ink jet composition of the present invention that can solve the above-described problems are presumed, but not limited to, as follows: Although the diketopyrrolopyrrole pigment itself has excellent intensity, non-aqueous ink jet compositions including pigment components merely containing the diketopyrrolopyrrole pigment cause uneven aggregation in the recorded matters, resulting in insufficient intensity of the recorded matters. In order to prevent the uneven aggregation, it is conceivable to use glycol ethers in the organic solvent. The glycol ethers have high solubility to nitrogen and oxygen in the air and are therefore contaminated with large amounts of nitrogen and oxygen as impurities. In addition, if the non-aqueous ink jet composition including such organic solvents is left in, for example, the atmospheric air, the composition absorbs nitrogen and oxygen in the air with time. However, in a non-aqueous ink jet composition containing dissolved nitrogen and oxygen, gas is generated in the composition by various changes (changes in temperature and pressure) at discharge by an ink jet method, resulting in poor discharge stability. In contrast, the diketopyrrolopyrrole pigment has high hydrophobicity. Accordingly, a non-aqueous ink jet composition containing this pigment relatively readily deteriorates the dispersibility of the pigment by being in contact with water, resulting in poor storage stability. Accordingly, the non-aqueous ink jet composition according to the present invention includes both a pigment component containing a diketopyrrolopyrrole pigment and the glycol ethers and contains dissolved nitrogen in an amount regulated to 90 mass ppm or less. As a result, the non-aqueous ink jet composition according to the present invention prevents uneven aggregation of the diketopyrrolopyrrole pigment to effectively utilize the excellent intensity of the pigment and also has excellent discharge stability.

In the non-aqueous ink jet composition according to the present invention, the amount of dissolved nitrogen is preferably 10 mass ppm or more based on the total amount of the non-aqueous ink jet composition; and the glycol ethers preferably includes a glycol diether represented by Formula (1) and/or a glycol monoether represented by Formula (2):

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In the non-aqueous ink jet composition according to the present invention, the amount of the pigment component is preferably 1.0 mass % or more and 5.0 mass % or less based on the total amount of the non-aqueous ink jet composition; the amount of the glycol ethers is preferably 10 mass % or more and 90 mass % or less based on the total amount of the non-aqueous ink jet composition; the organic solvent preferably further contains a cyclic lactone; and the composition preferably further contains a vinyl chloride resin.

In addition, the ink jet recording method according to the present invention includes a step of performing recording on a recording medium by an ink jet method using the non-aqueous ink jet composition according to the present invention.

The present inventors have also diligently studied to solve the above-described problems and, as a result, have found that a non-aqueous ink jet composition including a pigment component at least containing a diketopyrrolopyrrole pigment and a prescribed organic solvent can form recorded matters having excellent intensity, and have accomplished the present invention.

That is, a second aspect of the present invention relates to a non-aqueous ink jet composition including a pigment component containing a diketopyrrolopyrrole pigment and an organic solvent. The organic solvent contains a glycol ether, and the pigment has an average particle diameter of 100 nm or more and 240 nm or less. The factors of such a non-aqueous ink jet composition that can solve the above-described problems are presumed, but not limited, as follows: Known non-aqueous compositions containing pigments having an average particle diameter higher than 240 nm can improve the intensity of the resulting recorded matters. However, excellent discharge stability cannot be obtained mainly due to the pigments having an average particle diameter higher than 240 nm. In contrast, the non-aqueous composition of the embodiment enhances the color developing property of the pigment itself by employing a diketopyrrolopyrrole pigment and prevents occurrence of uneven aggregation in the resulting recorded matters by containing the glycol ether. As a result, even if the pigment used has an average particle diameter of 240 nm or less, the resulting recorded matters have sufficiently excellent intensity. In addition, excellent discharge stability can be achieved mainly due to the average particle diameter of 240 nm or less of the pigment.

In the non-aqueous ink jet composition according to the present invention, the diketopyrrolopyrrole pigment is preferably a diketopyrrolopyrrole red pigment, and the organic solvent preferably contains a glycol diether represented by Formula (1) and a glycol monoether represented by Formula (2):

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In the non-aqueous ink jet composition according to the present invention, the amount of the pigment component is preferably 1.0 mass % or more and 5.0 mass % or less based on the total amount of the non-aqueous ink jet composition; the total amount of the glycol diether and the glycol monoether is preferably 10 mass % or more and 90 mass % or less based on the total amount of the non-aqueous ink jet composition; and the organic solvent preferably further contains a cyclic lactone. The non-aqueous ink jet composition preferably further includes a vinyl chloride resin.

In addition, the ink jet recording method according to the present invention includes a step of performing recording on a recording medium by an ink jet method using the non-aqueous ink jet composition according to the present invention.

BRIEF DESCRIPTION OF THE DRAWINGS

The invention will be described with reference to the accompanying drawings, wherein like numbers reference like elements.

FIG. 1 is a perspective view schematically illustrating the configuration of a printer according to an embodiment of the present invention.

DESCRIPTION OF EXEMPLARY EMBODIMENTS

A first aspect (hereinafter, referred to as "the embodiment") for implementing the present invention will now be described in detail with reference to the drawing as needed. The following embodiment is exemplification for explaining the present invention and is not intended to limit the present invention to the following contents. The present invention can be implemented by being appropriately modified within the scope of the gist. In the drawing, the same elements are denoted by the same reference signs, and the duplicated explanation is omitted. The positional relation such as up and down and right and left is based on the positional relation shown in the drawing, unless otherwise specified. The dimensional ratio is not limited to that shown in the drawing.

Non-Aqueous Ink Jet Composition

The non-aqueous ink jet composition (hereinafter, also simply referred to as "ink jet composition", "non-aqueous composition", or "composition") of the embodiment includes a pigment component containing a diketopyrrolopyrrole pigment and an organic solvent. In the non-aqueous ink jet composition, the organic solvent contains glycol ethers, and the amount of dissolved nitrogen is 90 mass ppm or less based on the total amount of the non-aqueous ink jet composition.

The composition of the embodiment includes a pigment component containing a diketopyrrolopyrrole pigment and also the glycol ethers and includes dissolved nitrogen in an amount of 90 mass ppm or less, and thereby has excellent discharge stability and provides excellent intensity to the resulting recorded matters. The factors thereof are presumed (but not limited to) as follows. Although the diketopyrrolopyrrole pigment itself has excellent intensity, non-aqueous ink jet compositions including pigment components merely containing the diketopyrrolopyrrole pigment cause uneven aggregation in the resulting recorded matters, resulting in insufficient intensity of the recorded matters. In order to prevent the uneven aggregation, it is conceivable to use glycol ethers as the organic solvent. However, the glycol ethers have high hygroscopic properties to nitrogen and oxygen in the air and are therefore contaminated with large amounts of nitrogen and oxygen as impurities. In addition, if the non-aqueous ink jet composition including such an organic solvent is left in, for example, the atmospheric air, the composition absorbs nitrogen and oxygen in the air with time. A non-aqueous ink jet composition containing dissolved nitrogen or oxygen generates gas in the composition by various changes (changes in temperature and pressure) when discharged by an ink jet method, resulting in poor discharge stability. Accordingly, the non-aqueous ink jet composition according to the embodiment includes both a pigment component containing a diketopyrrolopyrrole pigment and the glycol ethers and regulates the amount of dissolved nitrogen to 90 mass ppm or less. As a result, the non-aqueous ink jet composition according to the embodiment prevents uneven aggregation of the diketopyrrolopyrrole pigment to effectively utilize the excellent intensity of the pigment and has excellent discharge stability.

In the embodiment, the term "non-aqueous composition" refers to a composition of which the main solvent is of other than water, such as an organic solvent. Herein, the term "main solvent" indicates that the amount of the solvent in a composition is 50 mass % or more, preferably 70 mass % or more, and more preferably 90 mass % or more based on 100 mass % of the composition. In addition, it is preferable that water is not intentionally added to a composition as a main solvent component in preparation of the composition, and it is preferable that water is inevitably contained in a composition as an impurity. The amount of water in the composition is preferably 3.0 mass % or less, more preferably 2.0 mass % or less, more preferably 1.0 mass % or less, and more preferably 0.5 mass % or less based on 100 mass % of the composition. The lower limit of the water content is not particularly limited and may be lower than the detection limit or may be 0.01 mass %.

In the embodiment, the term "amount of dissolved nitrogen" refers to the amount of nitrogen dissolved in a non-aqueous composition and is an indicator of the amount of air dissolved in the non-aqueous composition. The amount of dissolved nitrogen is 90 mass ppm or less, preferably 10 mass ppm or more and 90 mass ppm or less, more preferably 20 mass ppm or more and 90 mass ppm or less, more preferably 30 mass ppm or more and 75 mass ppm or less, and most preferably 40 mass ppm or more and 60 mass ppm or less based on the total amount of the non-aqueous composition. The non-aqueous composition has excellent discharge stability by restricting the amount of dissolved nitrogen to 90 mass ppm or less. An amount of dissolved nitrogen of 20 mass ppm or more provides excellent intensity to the resulting recorded matters and can be easily achieved, for example, by deaeration treatment of the non-aqueous composition for a short time, resulting in a tendency of manufacturability to be excellent. In particular, if the amount of dissolved nitrogen is regulated to 20 mass ppm or more, a non-aqueous composition containing a diketopyrrolopyrrole pigment can shorten the time for deaeration treatment, compared with that containing another pigment. In addition, a non-aqueous composition containing dissolved nitrogen in an amount of 20 mass ppm or more does not significantly absorb air, unlike non-aqueous compositions in an excessively deaerated state in which the amount of dissolved oxygen is lower than the lower limit, and thereby tends to prevent deterioration of the discharge stability.

The amount of dissolved nitrogen in the composition can be controlled by, for example, removing air composed of nitrogen and oxygen from each component of the composition, specifically, removing air composed of nitrogen and oxygen contaminating the organic solvent; removing air composed of nitrogen and oxygen from the composition; or preventing air composed of nitrogen and oxygen from contaminating the composition during preparation of the composition. Among these methods, the method removing air composed of nitrogen and oxygen contaminating the organic solvent is more specifically performed by reduced pressure treatment or heating treatment of the composition described below. The amount of dissolved nitrogen can be measured by a method described in examples below. For example, the amount of dissolved nitrogen in the composition immediately before the use by means of an ink jet recording apparatus is measured.

The non-aqueous ink jet composition of the embodiment includes a pigment and an organic solvent described below. Compositions containing solvents are roughly classified into two: a real-solvent (high organic solvent) composition and an eco-solvent (low organic solvent) composition. The eco-solvent composition is a low-odor and human and environment-friendly composition, and the organic solvent contained in the composition does not fall under the category of organic solvents defined by the Industrial Safety and Health Act, does not fall under the categories of Class-1 and Class-2 organic solvents defined by the Ordinance On Prevention of Organic Solvent Poisoning, and does not fall under the category of organic solvents requiring local exhaust ventilation in indoor workplaces defined as the installation environment by the Fire Service Act. Although the non-aqueous composition of the embodiment may contain an organic solvent that can be used in real-solvent compositions or an organic solvent that can be used in eco-solvent compositions, preferred is an organic solvent that can be used in eco-solvent compositions.

The "ink jet composition" in the embodiment can be used in a variety of purposes as a composition to be discharged by an ink jet method, and the purposes are not limited. Specifically, the composition is used, for example, as a composition for inks. The composition of the embodiment will now be described in more detail with a case of being used as an ink composition for ink jet recording (hereinafter, also simply referred to as "ink composition"), which in one embodiment of ink jet compositions, but the composition of the embodiment is not limited thereto.

Pigment

The pigment component of the embodiment may contain any pigment as long as a diketopyrrolopyrrole pigment is contained, and may contain only a diketopyrrolopyrrole pigment or may contain a mixture of a diketopyrrolopyrrole pigment and a pigment other than the diketopyrrolopyrrole pigment (hereinafter, also referred to as "other pigment"). The composition of the embodiment including a pigment component containing a diketopyrrolopyrrole pigment can provide excellent intensity to recorded matters. In addition, the composition containing a diketopyrrolopyrrole pigment has excellent discharge stability compared with compositions containing other pigments. This is conjectured as follows. Since the diketopyrrolopyrrole pigment has high hydrophobicity and high affinity with a non-aqueous atmosphere, the pigment hardly contains micro bubble nuclei therein. As a result, bubbles are hardly generated in discharge by an ink jet method. Accordingly, it is also conjectured that the pigment component of the embodiment containing a diketopyrrolopyrrole pigment hardly causes defects in discharge by relatively simple deaeration treatment even if the amount of dissolved nitrogen is large, compared with pigments other than the diketopyrrolopyrrole pigment, and hardly generate bubbles even if the amount of the pigment is large, compared with other pigments, to hardly cause defects in discharge. In addition, it is conjectured as another reason for the excellent discharge stability that excellent intensity can be provided to recorded matters by the diketopyrrolopyrrole pigment in a smaller amount compared with the compositions containing other pigments (but, the factors are not limited thereto).

The diketopyrrolopyrrole pigment may be any pigment having a diketopyrrolopyrrole skeleton. The diketopyrrolopyrrole skeleton may include a substituent, such as an alkyl group, or may include no substituent (the case that the substituents are all hydrogen atoms). Examples of the diketopyrrolopyrrole pigment include, but not limited to, red organic pigments, such as C.I. Pigment Red 254, C.I. Pigment Red 255, C.I. Pigment Red 264, C.I. Pigment Red 270, and C.I. Pigment Red 272; and orange organic pigments, such as C.I. Pigment Orange 71, C.I. Pigment Orange 73, and C.I. Pigment Orange 81. Among these pigments, from the viewpoint of forming recorded matters having more excellent intensity, preferred are the red organic pigments: C.I. Pigment Red 254, C.I. Pigment Red 255, and C.I. Pigment Red 264; more preferred are C.I. Pigment Red 254 and C.I. Pigment Red 255; and most preferred is C.I. Pigment Red 254. These diketopyrrolopyrrole pigments may be used alone or as a mixture of two or more thereof.

The diketopyrrolopyrrole pigment is preferably a diketopyrrolopyrrole red pigment. The diketopyrrolopyrrole red pigment exhibits a red color and has a diketopyrrolopyrrole skeleton, and examples thereof include diketopyrrolopyrrole red pigments mentioned above as red pigments. Herein, the term "exhibiting a red color" indicates that when the color of a recorded matter formed by applying an ink jet composition to a white recording medium so as to cover the entire surface is measured by colorimetry using Spectrolino (manufactured by GretagMacbeth), the value h in the L*C*h color space of the CIE standard colorimetric system is −30° to 45°, preferably −30° to 32°, more preferably −30° to 30°, and most preferably −30° to 25°.

The amount of the diketopyrrolopyrrole pigment is not particularly limited and is 30 mass % or more and 100 mass % or less, 50 mass % or more and 100 mass % or less, or 70 mass % or more and 100 mass % or less based on the total amount (100 mass %) of the pigment component. The use of a composition containing the diketopyrrolopyrrole pigment in an amount within such a range tends to provide more excellent intensity.

The other pigment may be any pigment other than the diketopyrrolopyrrole pigment and can be, for example, inorganic pigments and organic pigments that are usually contained in known non-aqueous ink compositions. These other pigments may be used alone or as a mixture of two or more thereof.

Examples of the organic pigment include, but not limited to, azo pigments (e.g., azo lake, insoluble azo pigments, condensed azo pigments, and chelate azo pigments), polycyclic pigments (e.g., phthalocyanine pigments, perylene and perylene pigments, anthraquinone pigments, quinacridone pigments, dioxadine pigments, thioindigo pigments, isoindolinone pigments, and quinophthalone pigments), dye lakes (e.g., basic dye lakes and acid dye lakes), nitro pigments, nitroso pigments, aniline black, and daylight fluorescent pigments.

Examples of the inorganic pigment include, but not limited to, carbon black, titanium dioxide, silica, and alumina.

It is also preferred to use a red organic pigment (hereinafter, also referred to as "other red organic pigment") other than the diketopyrrolopyrrole pigment or an orange organic pigment (hereinafter, also referred to as "other orange organic pigment") other than the diketopyrrolopyrrole pigment, as the other pigment, from the viewpoint of discharge stability and abrasion resistance.

Examples of the other red organic pigment include, but not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 179, C.I. Pigment Red 194, C.I. Pigment Red 209, C.I. Pigment Red 222, and C.I. Pigment Red 224.

The other orange organic pigment is not particularly limited, and examples thereof include C.I. Pigment Orange 31, C.I. Pigment Orange 43, and C.I. Pigment Orange 64.

The amount of the pigment component is preferably 0.5 mass % or more and 10 mass % or less, more preferably 1.0 mass % or more and 7.0 mass % or less, and most preferably 2.5 mass % or more and 3.0 mass % or less, based on the total amount (100 mass %) of the composition. A pigment component content of 0.5 mass % or more tends to provide more excellent intensity to the resulting recorded matters, and a pigment component content of 10 mass % or less tends to provide more excellent storage stability and discharge stability.

The organic solvent of the embodiment is not particularly limited as long as glycol ethers are contained. The glycol ethers preferably include a glycol diether represented by Formula (1) (hereinafter, also referred to as "specific glycol diether") from the viewpoint of providing recorded matters having more excellent abrasion resistance and also the viewpoint of improving the dispersion stability. In addition, the glycol ethers preferably include a glycol monoether represented by Formula (2) (hereinafter, also referred to as "specific glycol monoether") from the viewpoint of providing recorded matters having more excellent intensity. Furthermore, the glycol ethers more preferably include both the specific glycol diether and the specific glycol monoether from the viewpoint of improving the dispersion stability and providing recorded matters having more excellent intensity.

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

Examples of the specific glycol diether include, but not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these glycol diethers, preferred are diethylene glycol ethyl methyl ether, diethylene glycol diethyl ether, and tetraethylene glycol dimethyl ether; and more preferred is diethylene glycol ethyl methyl ether. The composition containing such a preferred specific glycol diether tends to provide more excellent abrasion resistance to the resulting recorded matters and tends to have more excellent discharge stability. These specific glycol diethers may be used alone or in combination of two or more thereof.

The amount of the specific glycol diether is preferably 5.0 mass % or more and 90 mass % or less, more preferably 10 mass % or more and 80 mass % or less, and most preferably 20 mass % or more and 75 mass % or less based on the total amount (100 mass %) of the composition. The composition containing the specific glycol diether within the above-mentioned range tends to provide more excellent intensity to the resulting recorded matters and have more excellent discharge stability. Herein, the amount of the specific glycol diether in the composition is the amount including the amount of the specific glycol diether contained in, for example, a dispersion.

Examples of the specific glycol monoether include, but not limited to, ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether. Among these glycol monoethers, preferred are ethylene glycol monobutyl ether, triethylene glycol monobutyl ether, tetraethylene glycol monoethyl ether, and dipropylene glycol monoethyl ether; and more preferred is triethylene glycol monobutyl ether. The composition containing such a preferred specific glycol monoether tends to provide more excellent abrasion resistance to the resulting recorded matters and have more excellent discharge stability. These specific glycol monoethers may be used alone or in combination of two or more thereof.

The amount of the specific glycol monoether is preferably 5.0 mass % or more and 80 mass % or less, more preferably 7.0 mass % or more and 50 mass % or less, and most preferably 10 mass % or more and 20 mass % or less based on the total amount (100 mass %) of the composition. The composition containing the specific glycol monoether within the above-mentioned range tends to provide more excellent intensity to the resulting recorded matters and have more excellent discharge stability. Herein, the amount of the specific glycol monoether in the composition is the amount including the amount of the specific glycol monoether contained in, for example, a dispersion.

The amount of the glycol ethers is preferably 5.0 mass % or more and 95 mass % or less, more preferably 10 mass % or more and 90 mass % or less, and most preferably 20 mass % or more and 85 mass % or less based on the total amount (100 mass %) of the composition. The composition containing the glycol ethers within the above-mentioned range tends to provide more excellent intensity to the resulting recorded matters and have more excellent discharge stability. Herein, the amount of the glycol ethers in the composition is the amount including the amounts of the glycol ethers contained in, for example, a dispersion.

The organic solvent may contain a glycol diether (hereinafter, also referred to as "other glycol diether") other than the specific glycol diether and/or a glycol monoether (hereinafter, also referred to as "other glycol monoether") other than the specific glycol monoether. Examples of the other glycol diether include heptaethylene glycol dimethyl ether. Examples of the other glycol monoether include heptaethylene glycol monomethyl ether.

The organic solvent tends to provide more excellent abrasion resistance to the resulting recorded matters and have more excellent storage stability by further containing a cyclic lactone. The cyclic lactone may be any compound having a ring structure formed by ester bonds, and examples thereof include γ-lactone having a five-membered ring structure, δ-lactone having a six-membered ring structure, and ε-lactone having a seven-membered ring structure. Examples of the cyclic lactone include, but not limited to, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among these cyclic lactones, preferred are γ-lactone having a five-membered ring structure and δ-lactone having a six-membered ring structure; more preferred are γ-butyrolactone, γ-valerolactone, and δ-valerolactone; and most preferred is γ-butyrolactone. The composition containing such a cyclic lactone tends to provide further enhanced abrasion resistance. The cyclic lactones may be used alone or in combination of two or more thereof.

The amount of the cyclic lactone is preferably 1.0 mass % or more and 50 mass % or less, more preferably 3.0 mass % or more and 40 mass % or less, and most preferably 5.0 mass % or more and 30 mass % or less based on the total amount (100 mass %) of the composition. A cyclic lactone content of 1.0 mass % or more tends to provide more excellent abrasion resistance, and a cyclic lactone content of 50 mass % or less tends to provide more excellent intensity. Herein, the amount of the cyclic lactone in the composition is the amount including the amount of the cyclic lactone contained in, for example, a dispersion.

The organic solvent (other organic solvent) other than the glycol diether, the glycol monoether, and the cyclic lactone is preferably a hydrocarbon solvent, an alcohol solvent, and an ester solvent, and more preferably an ester solvent.

The hydrocarbon solvent is not particularly limited, and examples thereof include aliphatic hydrocarbons (e.g., paraffin and isoparaffin), alicyclic hydrocarbons (e.g., cyclohexane, cyclooctane, and cyclodecane), and aromatic hydrocarbons (e.g., benzene, toluene, xylene, naphthalene, and tetralin). The hydrocarbon solvent may be a commercially available one, and examples thereof include aliphatic hydrocarbon solvents and alicyclic hydrocarbon solvents, such as IP Solvent 1016, IP Solvent 1620, and IP Clean LX (these are all trade names, manufactured by Idemitsu Kosan Co., Ltd.), Isopar G, Isopar L, Isopar H, Isopar M, Exxsol D40, Exxsol D80, Exxsol D100, Exxsol D130, and Exxsol D140 (these are all trade names, manufactured by Exxon), NS Clean 100, NS Clean 110, NS Clean 200, and NS Clean 220 (these are all trade names, manufactured by JX Nippon Oil & Energy Corporation), and Naphtesol 160, Naphtesol 200, and Naphtesol 220 (these are all trade names, manufactured by JX Nippon Oil & Energy Corporation); and aromatic hydrocarbon solvents, such as Solvesso 200 (trade name, manufactured by Exxon).

The alcohol solvent is not particularly limited, and examples thereof include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, and 3-heptanol.

The ester solvent is not particularly limited, and examples thereof include methyl acetate, ethyl acetate, n-propyl acetate, isopropyl acetate, n-butyl acetate, isobutyl acetate, isopentyl acetate, sec-butyl acetate, amyl acetate, methoxybutyl acetate (3-methoxybutyl acetate, 3-methoxy-3-methyl-1-butyl acetate), methyl lactate, ethyl lactate, butyl lactate, methyl caprylate, methyl caprate, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, and diethylene glycol monobutyl ether acetate. Among these ester solvents, preferred are methoxybutyl acetate, methyl caprylate, methyl caprate, methyl lactate, and ethyl lactate.

The total amount of at least one of hydrocarbon solvents, alcohol solvents, and ester solvents as the organic solvent is preferably 30 mass % or more and 80 mass % or less, more preferably 40 mass % or more and 60 mass % or less, and most preferably 45 mass % or more and 55 mass % or less based on the total amount (100 mass %) of the non-aqueous composition. The composition containing these solvents within such a range tends to provide more excellent intensity to the resulting recorded matters and have more excellent discharge stability.

The amount of the organic solvent is preferably 35 mass % or more and 95 mass % or less, more preferably 50 mass % or more and 90 mass % or less, and most preferably 60 mass % or more and 90 mass % or less based on the total amount (100 mass %) of the composition. Herein, the amount of the organic solvent in the composition is the amount including the amount of the organic solvent contained in, for example, a dispersion.

Resin

The composition of the embodiment may further include a resin for mainly adjusting the viscosity of the composition. Examples of the resin include, but not limited to, acrylic resins; styrene acrylic resins; rosin-modified resins; phenolic resins; terpene-based resins; polyester resins; polyamide resins; epoxy resins; vinyl chloride resins, such as vinyl chloride-vinyl acetate copolymer resins; fiber-based resins, such as cellulose acetate butyrate; and vinyl toluene-α-methyl styrene copolymer resins. Among these resins, preferred are vinyl chloride resins; and more preferred are vinyl chloride-vinyl acetate copolymer resins. The composition containing such a resin tends to further enhance the abrasion resistance of the resulting recorded matters. These resins may be used alone or as a mixture of two or more thereof.

The vinyl chloride resin is not particularly limited, and examples thereof include copolymer resins of vinyl chloride and one or more selected from the group consisting of vinyl acetate, vinylidene chloride, acryls, maleic acid, and vinyl alcohol. Among these resins, preferred are vinyl chloride-vinyl acetate copolymer resins composed of vinyl chloride and vinyl acetate; and more preferred are vinyl chloride-vinyl acetate copolymer resins having a glass transition temperature of 60° C. or more and 80° C. or less. The acryl may be any compound copolymerizable with vinyl chloride, and examples thereof include acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers, such as acrylic acid, methacrylic acid, maleic acid, fumaric acid, itaconic acid, mono-n-butyl maleate, mono-n-butyl fumarate, and mono-n-butyl itaconate; hydroxy group-containing (meth)acrylates; amide group-containing monomers; glycidyl group-containing monomers; cyano group-containing monomers; hydroxy group-containing allyl compounds; tertiary amino group-containing monomers; and alkoxysilyl group-containing monomers. These acryls may be used alone or in combination of two or more thereof.

The amount of the resin is preferably 0.1 mass % or more and 10 mass % or less, more preferably 0.3 mass % or more and 5.0 mass % or less, and most preferably 0.5 mass % or more and 3.0 mass % or less based on the total amount (100 mass %) of the composition. The composition containing a resin within such a range tends to provide further excellent abrasion resistance.

The composition of the embodiment may further include one or more optional components that can be used in known non-aqueous ink compositions for ink jet, in addition to the above-mentioned components. Examples of the optional component include coloring materials such as a dye, surfactants, dispersants, penetrants, moisturizing agents, dissolution aids, viscosity modifiers, pH adjusters, antioxidants, preservatives, antifungal agents, corrosion inhibitors, chelating agents for capturing metal ions that influence dispersion, other additives, and solvents. These components may be each used alone or in combination.

Ink Jet Recording Method

The ink jet recording method of the embodiment includes a step of performing recording on a recording medium by an ink jet method using the non-aqueous ink jet composition described above. Specifically, an image is recorded by discharging droplets of the non-aqueous composition and allowing the droplets to adhere to a recording medium, preferably, a low-absorbent recording medium.

In the present specification, the term "low-absorbent recording medium" refers to a recording medium that absorbs 10 mL/m$^2$ or less of water within 30 msec$^{1/2}$ from the start of contact with water when measured by a Bristow method. Such a property may be possessed by at least the recording surface. In this definition, examples of the "low-absorbent recording medium" in the present invention include non-absorbent recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorption Test Method—Bristow Method" in "JAPAN TAPPI Paper and Pulp Test Methods, 2000 Edition".

Examples of the low-absorbent recording medium include sheets, films, and fiber products containing low-absorbent materials. The low-absorbent recording medium may be composed of a base material (for example, paper, fiber, leather, plastic, glass, ceramics, or a metal) and a layer containing a low-absorbent material (hereinafter, also referred to as "low-absorbent layer") disposed on the surface of the base material. Examples of the low-absorbent material include, but not limited to, olefin-based resins, ester-based resins, urethane-based resins, acrylic-based resins, and vinyl chloride-based resins.

Among these media, a medium having a recording surface containing a vinyl chloride-based resin can be preferably used as the low-absorbent recording medium. Examples of the vinyl chloride-based resin include poly(vinyl chloride), vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics, such as thickness, shape, color, softening temperature, and hardness, of the low-absorbent recording medium are not particularly limited.

The non-aqueous composition of the embodiment having the above-described formulation can show advantageous effects, excellent intensity and abrasion resistance, against, in particular, a low-absorbent recording medium, specifically, a recording medium containing a vinyl chloride-based resin. Accordingly, the ink jet recording method according to the embodiment can record images having further excellent intensity and abrasion resistance by allowing droplets of the non-aqueous composition to adhere to, in particular, a low-absorbent recording medium, specifically, a recording medium containing a vinyl chloride-based resin.

The ink jet recording method of the embodiment may be performed with any ink jet recording apparatus, and a drop-on-demand ink jet recording apparatus is preferred. Examples of the drop-on-demand ink jet recording apparatus include those employing a piezoelectric element recording method using piezoelectric elements disposed in recording heads and those employing a heat jet recording method using heat energy generated by, for example, heaters of heat-generating resistor elements disposed in recording heads. Any recording method can be employed for the ink jet recording apparatus. An example of the ink jet recording apparatus of the embodiment will now be described in more detail.

Ink Jet Recording Apparatus

The ink jet recording apparatus of the embodiment can use a known ink jet printer. For example, the ink jet printer (hereinafter, also simply referred to as "printer") shown in FIG. 1 can be used.

FIG. 1 is a perspective view illustrating the configuration of a printer 1 in the embodiment. As shown in FIG. 1, the printer 1 includes a carriage 4 on which an ink jet recording head 2 is mounted and an ink cartridge 3 is detachably installed; a platen 5 disposed below the ink jet recording head (ink jet head) 2 and onto which a recording medium 6 is transported; a carriage-moving mechanism 7 for moving the carriage 4 in the medium width direction (main scanning direction S) of the recording medium 6; and a medium-transporting mechanism 8 for transporting the recording medium 6 in the medium-transporting direction. The printer 1 also has a controller CONT that controls the entire operation of the printer 1.

The recording head 2 includes cavities for discharging the non-aqueous composition accommodated therein from nozzles; discharge-driving portions provided to the corresponding cavities and applying driving force for discharge to the non-aqueous composition; and nozzles provided to the corresponding cavities and discharging the non-aqueous composition to the outside of the head. One head may be provided with a plurality of independent cavities and the discharge-driving portions and nozzles provided to the corresponding cavities. The discharge-driving portion can be formed using, for example, an electromechanical transducer, such as a piezoelectric element, that changes the volume of the cavity by mechanical deformation, or an electrothermal transducer that generates heat to form air bubbles in the non-aqueous composition and thereby discharges the non-aqueous composition. The printer 1 may include one head for one non-aqueous composition or may include a plurality of heads for one non-aqueous composition.

The ink cartridge 3 is composed of a plurality of independent cartridges, and each cartridge is filled with the non-aqueous composition. The cartridge filled with the non-aqueous composition may be removed from the carriage 4 during ordinary printing, but should be installed on the carriage 4 at least when the flow channel of the non-aqueous composition is rinsed.

The platen 5 includes a platen heater and is configured so as to heat the recording medium to a preset temperature. The recording head 2 does not have a built-in heater, but the temperature of the recording head is also increased as a result of heating of the recording medium, and thereby the temperature of the non-aqueous composition accommodated in the recording head 2 tends to raise. The printer 1 may include an after-heater (not shown) in the recording medium-transporting path downstream of the platen heater.

The above-described non-aqueous composition of the embodiment is discharged from the recording head 2. Herein, the temperature of the platen when the non-aqueous composition is discharged from the recording head 2 is preferably 35° C. or more and more preferably 40° C. or more, and is preferably 80° C. or less, more preferably 70° C. or less, more preferably 60° C. or less, and most preferably 50° C. or less. The platen heated with a platen heater to a temperature within the above-mentioned range is advantageous to provide higher quality to recorded matters.

In addition, in the embodiment, the frequency of discharge from the recording head 2 is preferably 1.0 kHz or more and 200 kHz or less. A discharge frequency lower than the upper limit of the above-mentioned range is preferred from the point of provide more excellent discharge stability, and a discharge frequency higher than the lower limit of the above-mentioned range is preferred from the point of providing a higher recording speed. The term "discharge frequency" indicates the frequency of discharging each non-aqueous composition droplet as a discharge unit. The discharge frequency is preferably 2.0 kHz or more, more preferably 3.0 kHz or more, more preferably 5.0 kHz or more, and most preferably 10 kHz or more from the viewpoint of further accelerating the recording speed. In addition, the discharge frequency is preferably 200 kHz or less, more preferably 150 kHz or less, more preferably 100 kHz or less, and most preferably 50 kHz or less from the viewpoint of enhancing the discharge stability. Furthermore, the discharge frequency is preferably 20 kHz or less and more preferably 15 kHz or less from the point of providing further excellent discharge stability while maintaining the recording speed. At the same time, the discharge frequency is preferably 15 kHz or more and more preferably 20 kHz or more from the point of providing higher recording speed while maintaining the discharge stability.

As an example of the printer 1 of the embodiment, a so-called on-carriage type printer having the ink cartridge 3 mounted on the carriage 4 was described above, but the printer is not limited thereto. For example, the printer may be of a so-called off-carriage type, where an ink container (such as an ink pack or ink cartridge) filled with the non-aqueous composition is installed on, for example, the housing of the printer 1 and the non-aqueous composition is supplied to the head 2 through an ink supply tube.

The ink jet recording apparatus of the embodiment can employ an ink set including a plurality of non-aqueous compositions. The ink set of the embodiment may include a plurality of the non-aqueous ink jet compositions of the embodiment and may further include one or more non-aqueous compositions (other non-aqueous composition(s)) different from the non-aqueous ink jet compositions of the embodiment. In such a case, the ink set may include a magenta ink of the non-aqueous composition of the embodiment and a yellow ink and a cyan ink of the other non-aqueous compositions. Alternatively, the ink set may include a red ink of the non-aqueous composition of the embodiment and a magenta ink, a yellow ink, and a cyan ink of the other non-aqueous compositions. From the viewpoint of achieving more excellent color reproducibility, the non-aqueous composition of the embodiment is preferably used as a red ink and is preferably used together with magenta, yellow, and cyan inks of the other non-aqueous compositions.

A second aspect (hereinafter, referred to as "the embodiment") for implementing the present invention will now be described in detail with reference to the drawing as needed. The following embodiment is exemplification for explaining the present invention and is not intended to limit the present invention to the following contents. The present invention can be implemented by being appropriately modified within the scope of the gist. In the drawing, the same elements are denoted by the same reference signs, and the duplicated explanation is omitted. The positional relation such as up and down and right and left is based on the positional relation shown in the drawing, unless otherwise specified. The dimensional ratio is not limited to that shown in the drawing.

Non-Aqueous Ink Jet Composition

The non-aqueous ink jet composition (hereinafter, also simply referred to as "ink jet composition", "non-aqueous composition", or "composition") of the embodiment includes a pigment component containing a diketopyrrolopyrrole pigment and an organic solvent. The organic solvent contains a glycol ether. The pigment has an average particle diameter of 100 nm or more and 240 nm or less.

The composition of the embodiment includes a pigment component containing a diketopyrrolopyrrole pigment and also the glycol ether. The pigment has an average particle diameter of 100 nm or more and 240 nm or less. As a result, the resulting recorded matters have excellent intensity, and the composition has excellent storage stability. The factors thereof are presumed (but not limited to) as follows. Known non-aqueous compositions containing pigments having an average particle diameter higher than 240 nm can improve the intensity of the resulting recorded matters. However, excellent discharge stability cannot be obtained mainly due to the pigments having an average particle diameter higher than 240 nm. In contrast, the non-aqueous composition of the embodiment enhances the color developing property of the pigment itself by employing a diketopyrrolopyrrole pigment and prevents occurrence of uneven aggregation in the resulting recorded matters by containing the glycol ether. As a result, even if the pigment used has an average particle diameter is 240 nm or less, the resulting recorded matters have sufficiently excellent intensity. In addition, excellent discharge stability can be achieved mainly due to the average particle diameter of 240 nm or less of the pigment.

In the embodiment, the term "non-aqueous composition" refers to a composition of which the main solvent is of other than water, such as an organic solvent. Herein, the term "main solvent" indicates that the amount of the solvent in a composition is 50 mass % or more, preferably 70 mass % or more, and more preferably 90 mass % or more based on 100 mass % of the composition. In addition, it is preferable that water is not intentionally added to a composition as a main solvent component in preparation of the composition, and it is preferable that water is inevitably contained in a composition as an impurity. The amount of water in the composition is preferably 3.0 mass % or less, more preferably 2.0 mass % or less, more preferably 1.0 mass % or less, and most preferably 0.5 mass % or less based on 100 mass % of the composition. The lower limit of the water content is not particularly limited and may be lower than the detection limit or may be 0.01 mass %.

The amount of water in the composition can be controlled by, for example, removing water from each component of the composition, specifically, removing water contaminating the organic solvent; removing water from the composition; or preventing water from contaminating the composition during preparation of the composition. Among these methods, the method removing water contaminating the organic solvent is more specifically performed by purifying the organic solvent by distillation; applying the organic solvent to a semi-permeable membrane that selectively allows water to permeate; or selectively allowing water contaminating the organic solvent to adsorb to a water adsorbent. Among these methods, from the viewpoint of more efficiently and certainly reducing the amount of water, purification by distillation is preferred.

The non-aqueous ink jet composition of the embodiment includes a pigment and an organic solvent described below. Compositions containing solvents are roughly classified into two: a real-solvent (high organic solvent) composition and an eco-solvent (low organic solvent) composition. The eco-solvent composition is a low-odor and human and environment-friendly composition, and the organic solvent contained in the composition does not fall under the category of organic solvents defined by the Industrial Safety and Health Act, does not fall under the categories of Class-1 and Class-2 organic solvents defined by the Ordinance On Prevention of Organic Solvent Poisoning, and does not fall under the category of organic solvents requiring local exhaust ventilation in indoor workplaces defined as the installation environment by the Fire Service Act. Although the non-aqueous composition of the embodiment may contain an organic solvent that can be used in real-solvent compositions or an organic solvent that can be used in eco-solvent compositions, preferred is an organic solvent that can be used in eco-solvent compositions.

The "ink jet composition" in the embodiment can be used in a variety of purposes as a composition to be discharged by an ink jet method, and the purposes are not limited. Specifically, the composition is used, for example, as a composition for inks. The composition of the embodiment will now be described in more detail with a case of being used as an ink composition for ink jet recording (hereinafter, also simply referred to as "ink composition"), which in one embodiment of ink jet compositions, but the composition of the embodiment is not limited thereto.

Pigment

The pigment of the embodiment may contain any pigment as long as a diketopyrrolopyrrole pigment is contained, and may contain only a diketopyrrolopyrrole pigment or may contain a mixture of a diketopyrrolopyrrole pigment and a pigment other than the diketopyrrolopyrrole pigment (hereinafter, also referred to as "other pigment").

The diketopyrrolopyrrole pigment may be any pigment having a diketopyrrolopyrrole skeleton. The diketopyrrolopyrrole skeleton may include a substituent, such as an alkyl group, or may include no substituent (the case that the substituents are all hydrogen atoms). Examples of the diketopyrrolopyrrole pigment include, but not limited to, red organic pigments, such as C.I. Pigment Red 254, C.I. Pigment Red 255, C.I. Pigment Red 264, C.I. Pigment Red 270, and C.I. Pigment Red 272; and orange organic pigments, such as C.I. Pigment Orange 71, C.I. Pigment Orange 73, and C.I. Pigment Orange 81. Among these pigments, from the viewpoint of forming recorded matters having more excellent intensity, preferred are the red organic pigments: C.I. Pigment Red 254, C.I. Pigment Red 255, and C.I. Pigment Red 264; more preferred are C.I. Pigment Red 254 and C.I. Pigment Red 255; and most preferred is C.I. Pigment Red 254. These diketopyrrolopyrrole pigments may be used alone or as a mixture of two or more thereof.

The diketopyrrolopyrrole pigment is preferably a diketopyrrolopyrrole red pigment. The diketopyrrolopyrrole red pigment exhibits a red color and has a diketopyrrolopyrrole skeleton, and examples thereof include diketopyrrolopyrrole red pigments mentioned above as red pigments. Herein, the term "exhibiting a red color" indicates that when the color of a recorded matter formed by applying an ink jet composition to a white recording medium so as to cover the entire surface is measured by colorimetry using Spectrolino (manufactured by GretagMacbeth), the value h in the $L^*C^*h$ color space of the CIE standard colorimetric system is $-30°$ to $45°$, preferably $-30°$ to $32°$, more preferably $-30°$ to $30°$, and most preferably $-30°$ to $25°$.

The amount of the diketopyrrolopyrrole pigment is not particularly limited and is 30 mass % or more and 100 mass % or less, 50 mass % or more and 100 mass % or less, or 70 mass % or more and 100 mass % or less based on the total amount (100 mass %) of the pigment component. The use of a composition containing the diketopyrrolopyrrole pigment in an amount within such a range tends to provide more excellent intensity.

The pigment has an average particle diameter of 100 nm or more and 240 nm or less, preferably 120 nm or more and 230 nm or less, and more preferably 150 nm or more and 220 nm or less. The pigment having an average particle diameter of 100 nm or more provides excellent intensity to the resulting recorded matters and excellent weather resistance. The pigment having an average particle diameter of 240 nm or less enhances the dispersion stability of the diketopyrrolopyrrole pigment and provides excellent discharge stability. The pigment having an average particle diameter within such a range may be prepared by any method. For example, a commercially available pigment of which the particle diameter has been adjusted may be prepared; the average particle diameter may be adjusted within the above-mentioned range by mixing a plurality of pigments having different particle diameters; or a commercially available diketopyrrolopyrrole pigment is mixed with a solvent, and the mixture is then appropriately pulverized with, for example, a ball mill, bead mill, ultrasonic waves, or a jet mill to give a desired average particle diameter or particle diameter distribution. Further, as another method for adjusting the average particle diameter, a process involving preparation of a pigment having a small diameter as a primary particle and preparation of a dispersion of the pigment in a solvent by mixing the pigment with (a part or the whole of) the solvent while changing the amount of a dispersant can be employed. That is, use of a large amount of a dispersant prevents aggregation of the primary particles to allow dispersing at a particle diameter similar to that of the primary particles, resulting in a small average particle diameter determined on the basis of the diameter of the primary particles. In contrast, use of a small amount of a dispersant aggregates the primary particles, resulting in an average particle diameter determined on the basis of the particle diameter of secondary particles. In this process, a pigment having a smaller primary particle has a higher degree of freedom in control of the average particle diameter. Furthermore, in order to increase the degree of freedom in control of the average particle diameter, the prepared pigment may be pulverized with, for example, a ball mill to have a smaller diameter and then may be subjected to control of the average particle diameter using a dispersant. The average particle diameter is measured by, for example, laser microscopy or a coulter counter method. Herein, the term "average particle diameter" refers to volume average particle diameter.

The other pigment may be any pigment other than the diketopyrrolopyrrole pigment and can be, for example, inorganic pigments and organic pigments that are usually contained in known non-aqueous ink compositions. These other pigments may be used alone or as a mixture of two or more thereof.

Examples of the organic pigment include, but not limited to, azo pigments (e.g., azo lake, insoluble azo pigments, condensed azo pigments, and chelate azo pigments), polycyclic pigments (e.g., phthalocyanine pigments, perylene and perylene pigments, anthraquinone pigments, quinacridone pigments, dioxadine pigments, thioindigo pigments, isoindolinone pigments, and quinophthalone pigments), dye lakes (e.g., basic dye lakes and acid dye lakes), nitro pigments, nitroso pigments, aniline black, and daylight fluorescent pigments.

Examples of the inorganic pigment include, but not limited to, carbon black, titanium dioxide, silica, and alumina.

It is also preferred to use a red organic pigment (hereinafter, also referred to as "other red organic pigment") other than the diketopyrrolopyrrole pigment or an orange organic pigment (hereinafter, also referred to as "other orange organic pigment") other than the diketopyrrolopyrrole pigment, as the other pigment, from the viewpoint of discharge stability and abrasion resistance.

Examples of the other red organic pigment include, but not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 179, C.I. Pigment Red 194, C.I. Pigment Red 209, C.I. Pigment Red 222, and C.I. Pigment Red 224.

The other orange organic pigment is not particularly limited, and examples thereof include C.I. Pigment Orange 31, C.I. Pigment Orange 43, and C.I. Pigment Orange 64.

The amount of the pigment component is preferably 0.5 mass % or more and 10 mass % or less, more preferably 1.0 mass % or more and 5.0 mass % or less, more preferably 2.0 mass % or more and 4.0 mass % or less, and most preferably 2.5 mass % or more and 3.0 mass % or less, based on the total amount (100 mass %) of the composition. A pigment component content of 0.5 mass % or more tends to provide more excellent intensity and weather resistance to the resulting recorded matters, and a pigment component content of 10 mass % or less tends to provide more excellent weather resistance to the resulting recorded matters and have excellent discharge stability.

Organic Solvent

The organic solvent of the embodiment contains a glycol ether. In particular, the organic solvent containing a glycol diether represented by Formula (1) (hereinafter, also referred to as "specific glycol diether") improves the dispersion stability of the diketopyrrolopyrrole pigment to improve the discharge stability. The organic solvent containing a glycol monoether represented by Formula (2) (hereinafter, also referred to as "specific glycol monoether") improves the wet-spreading property of an ink containing a diketopyrrolopyrrole pigment and tends to provide better intensity.

The organic solvent preferably contains a glycol diether represented by Formula (1) and a glycol monoether represented by Formula (2) and preferably contains the glycol diether represented by Formula (1) in an amount higher than 50 mass % based on the total amount (100 mass %) of the glycol diether represented by Formula (1) and the glycol monoether represented by Formula (2). The non-aqueous composition having such a formulation has good dispersion stability and good discharge stability. In addition, the resulting recorded matters have high abrasion resistance.

$$R^1O-(R^3O)_m-R^2 \quad (1)$$

where, $R^1$ and $R^2$ each independently represent an alkyl group having 1 to 7 carbon atoms, $R^3$ represents an alkylene group having 1 to 3 carbon atoms, and m represents an integer of 1 to 7,

$$OH-(R^5O)_n-R^4 \quad (2)$$

where, $R^4$ represents an alkyl group having 1 to 7 carbon atoms, $R^5$ represents an alkylene group having 1 to 3 carbon atoms, and n represents an integer of 1 to 7.

In Formula (1), $R^1$ and $R^2$ each independently preferably represent an alkyl group having 1 to 5 carbon atoms; $R^3$ preferably represents an alkylene group having 2 or 3 carbon atoms; and m preferably represents an integer of 1 to 6. In Formula (2), $R^4$ preferably represents an alkyl group having 1 to 5 carbon atoms; $R^5$ preferably represents an alkylene group having 2 or 3 carbon atoms; and n preferably represents an integer of 1 to 6.

Examples of the specific glycol diether include, but not limited to, ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these glycol diethers, preferred are diethylene glycol ethyl methyl ether, diethylene glycol diethyl ether, and tetraethylene glycol dimethyl ether; and more preferred is diethylene glycol ethyl methyl ether. The composition containing such a preferred specific glycol diether tends to provide more excellent abrasion resistance to the resulting recorded matters and tends to have more excellent discharge stability. These specific glycol diethers may be used alone or in combination of two or more thereof.

Among the specific glycol diethers, more preferred are glycol diethers having a flash point of 100° C. or less, more preferably 90° C. or less, and more preferably 80° C. or less. The composition including a specific glycol diether having a flash point of 100° C. or less tends to provide excellent drying properties and more excellent abrasion resistance to the resulting recorded matters.

The amount of the specific glycol diether is preferably 5.0 mass % or more and 90 mass % or less, more preferably 20 mass % or more and 80 mass % or less, and most preferably 30 mass % or more and 70 mass % or less based on the total amount (100 mass %) of the composition. The composition containing the specific glycol diether within the above-mentioned range tends to provide more excellent intensity to the resulting recorded matters. Herein, the amount of the specific glycol diether in the composition is the amount including the amount of the specific glycol diether contained in, for example, a dispersion.

Examples of the specific glycol monoether include, but not limited to, ethylene glycol monomethyl ether, ethylene glycol monoethyl ether, ethylene glycol mono-n-propyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, and dipropylene glycol monoethyl ether. Among these glycol monoethers, preferred are ethylene glycol monobutyl ether, triethylene glycol monobutyl ether, tetraethylene glycol monobutyl ether, and dipropylene glycol monoethyl ether; and more preferred is triethylene glycol monobutyl ether. The composition containing such a preferred specific glycol monoether tends to provide more excellent abrasion resistance to the resulting recorded matters and have more excellent discharge stability. These specific glycol monoethers may be used alone or in combination of two or more thereof.

Among the specific glycol monoethers, more preferred are glycol monoethers having a flash point of 150° C. or less, more preferably 100° C. or less, more preferably 90° C. or less, and more preferably 80° C. or less. The composition including a specific glycol monoether having a flash point of 150° C. or less tends to provide excellent drying properties and more excellent abrasion resistance to the resulting recorded matters.

The amount of the specific glycol monoether is preferably 5.0 mass % or more and 80 mass % or less, more preferably 10 mass % or more and 60 mass % or less, and most preferably 15 mass % or more and 40 mass % or less based on the total amount (100 mass %) of the composition. The composition containing the specific glycol monoether within the above-mentioned range tends to provide more excellent intensity to the resulting recorded matters. Herein, the amount of the specific glycol monoether in the composition is the amount including the amount of the specific glycol monoether contained in, for example, a dispersion.

The total amount of the specific glycol diether and the specific glycol monoether is preferably 30 mass % or more and 99.5 mass % or less, more preferably 40 mass % or more and 95 mass % or less, and most preferably 50 mass % or more and 80 mass % or less based on the total amount (100 mass %) of the composition. The composition containing the specific glycol diether and the specific glycol monoether within the above-mentioned range tends to provide more excellent intensity to the resulting recorded matters. Herein, the total amount of the specific glycol diether and the specific glycol monoether in the composition is the amount including the amounts of the specific glycol diether and the specific glycol monoether contained in, for example, a dispersion.

The organic solvent may further contain a glycol diether (hereinafter, also referred to as "other glycol diether") other than the specific glycol diether and/or a glycol monoether (hereinafter, also referred to as "other glycol monoether") other than the specific glycol monoether. Examples of the other glycol diether include heptaethylene glycol dimethyl ether. Examples of the other glycol monoether include heptaethylene glycol monomethyl ether.

The organic solvent further containing a cyclic lactone tends to provide more excellent abrasion resistance to the resulting recorded matters. The cyclic lactone may be any compound having a ring structure formed by ester bonds, and examples thereof include γ-lactone having a five-membered ring structure, δ-lactone having a six-membered ring structure, and ε-lactone having a seven-membered ring structure. Examples of the cyclic lactone include, but not limited to, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among these cyclic lactones, preferred are γ-lactone having a five-membered ring structure and δ-lactone having a six-membered ring structure; more preferred are γ-butyrolactone, γ-valerolactone, and δ-valerolactone; and most preferred is γ-butyrolactone. The composition containing such a cyclic lactone tends to provide further enhanced abrasion resistance. The cyclic lactones may be used alone or in combination of two or more thereof.

The amount of the cyclic lactone is preferably 1.0 mass % or more and 50 mass % or less, more preferably 3.0 mass % or more and 40 mass % or less, and most preferably 5.0 mass % or more and 30 mass % or less based on the total amount (100 mass %) of the composition. A cyclic lactone content of 1.0 mass % or more tends to provide more excellent abrasion resistance, and a cyclic lactone content of 50 mass % or less tends to provide more excellent intensity. Herein, the amount of the cyclic lactone in the composition is the amount including the amount of the cyclic lactone contained in, for example, a dispersion.

The amount of the organic solvent is preferably 35 mass % or more and 95 mass % or less, more preferably 50 mass % or more and 90 mass % or less, and most preferably 60 mass % or more and 90 mass % or less based on the total amount (100 mass %) of the composition. Herein, the amount of the organic solvent in the composition is the amount including the amount of the organic solvent contained in, for example, a dispersion.

Resin

The composition of the embodiment may further includes a resin for mainly adjusting the viscosity of the composition. Examples of the resin include, but not limited to, acrylic resins; styrene acrylic resins; rosin-modified resins; phenolic resins; terpene-based resins; polyester resins; polyamide resins; epoxy resins; vinyl chloride resins, such as vinyl chloride-vinyl acetate copolymer resins; fiber-based resins, such as cellulose acetate butyrate; and vinyl toluene-α-methyl styrene copolymer resins. Among these resins, preferred are vinyl chloride resins; and more preferred are vinyl chloride-vinyl acetate copolymer resins. The composition containing such a resin tends to further enhance the abrasion resistance of the resulting recorded matters. These resins may be used alone or as a mixture of two or more thereof.

The vinyl chloride resin is not particularly limited, and examples thereof include copolymer resins of vinyl chloride and one or more selected from the group consisting of vinyl acetate, vinylidene chloride, acryls, maleic acid, and vinyl alcohol. Among these copolymer resins, preferred are vinyl chloride-vinyl acetate copolymer resins of vinyl chloride and vinyl acetate; and more preferred are vinyl chloride-vinyl acetate copolymer resins having a glass transition temperature of 60° C. or more and 80° C. or less. The acryl may be any compound copolymerizable with vinyl chloride, and examples thereof include acrylic esters, such as methyl acrylate, ethyl acrylate, isopropyl acrylate, n-butyl acrylate, and 2-ethylhexyl acrylate; methacrylic esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxyl group-containing monomers, such as acrylic acid, methacrylic acid, maleic acid, fumaric acid, itaconic acid, mono-n-butyl maleate, mono-n-butyl fumarate, and mono-n-butyl itaconate; hydroxy group-containing (meth)acrylates; amide group-containing monomers; glycidyl group-containing monomers; cyano group-containing monomers; hydroxy group-containing allyl compounds; tertiary amino group-containing monomers; and alkoxysilyl group-containing monomers. These acryls may be used alone or in combination of two or more thereof.

The amount of the resin is preferably 0.1 mass % or more and 10 mass % or less, more preferably 0.3 mass % or more and 5.0 mass % or less, and most preferably 0.5 mass % or more and 3.0 mass % or less based on the total amount (100 mass %) of the composition. The composition containing a resin within such an amount tends to provide further excellent abrasion resistance.

The composition of the embodiment may further include one or more optional components that can be used in known non-aqueous ink compositions for ink jet, in addition to the above-mentioned components. Examples of the optional component include coloring materials such as a dye, surfactants, dispersants, penetrants, moisturizing agents, dissolution aids, viscosity modifiers, pH adjusters, antioxidants, preservatives, antifungal agents, corrosion inhibitors, chelating agents for capturing metal ions that influence dispersion, other additives, and solvents. These components may be each used alone or in combination.

Ink Jet Recording Method

The ink jet recording method of the embodiment includes a process of carrying out recording on a recording medium by an ink jet method using the above-described non-aqueous composition. Specifically, an image is recorded by discharging droplets of the non-aqueous composition and allowing the droplets to adhere to a recording medium, preferably, a low-absorbent recording medium.

In the present specification, the term "low-absorbent recording medium" refers to a recording medium that absorbs 10 mL/m$^2$ or less of water within 30 msec$^{1/2}$ from the start of contact with water when measured by a Bristow method. Such a property may be possessed by at least the recording surface. In this definition, examples of the "low-absorbent recording medium" in the present invention include non-absorbent recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorption Test Method—Bristow Method" in "JAPAN TAPPI Paper and Pulp Test Methods, 2000 Edition".

Examples of the low-absorbent recording medium include sheets, films, and fiber products containing low-absorbent materials. The low-absorbent recording medium may be composed of a base material (for example, paper, fiber, leather, plastic, glass, ceramics, or a metal) and a layer containing a low-absorbent material (hereinafter, also referred to as "low-absorbent layer") disposed on the surface of the base material. Examples of the low-absorbent material include, but not limited to, olefin-based resins, ester resins, urethane-based resins, acrylic-based resins, and vinyl chloride-based resins.

Among these media, a medium having a recording surface containing a vinyl chloride-based resin can be preferably used as the low-absorbent recording medium. Examples of the vinyl chloride-based resin include poly(vinyl chloride), vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics, such as thickness, shape, color, softening temperature, and hardness, of the low-absorbent recording medium are not particularly limited.

The non-aqueous composition of the embodiment having the above-described formulation can show advantageous effects, excellent intensity and abrasion resistance, against, in particular, a low-absorbent recording medium, specifically, a recording medium containing a vinyl chloride-based resin. Accordingly, the ink jet recording method according to the embodiment can record images having further excellent intensity and abrasion resistance by allowing droplets of the non-aqueous composition to adhere to, in particular, a low-absorbent recording medium, specifically, a recording medium containing a vinyl chloride-based resin.

The ink jet recording method of the embodiment may be performed with any ink jet recording apparatus, and preferred is a drop-on-demand ink jet recording apparatus. Examples of the drop-on-demand ink jet recording apparatus include those employing a piezoelectric element recording method using piezoelectric elements disposed in recording heads and those employing a heat jet recording method using heat energy generated by, for example, heaters of heat-generating resistor elements disposed in recording heads. Any recording method can be employed for the ink jet recording apparatus. An example of the ink jet recording apparatus of the embodiment will now be described in more detail.

Ink Jet Recording Apparatus

The ink jet recording apparatus of the embodiment can use a known ink jet printer. For example, the ink jet printer (hereinafter, also simply referred to as "printer") shown in FIG. 1 can be used.

FIG. 1 is a perspective view illustrating the configuration of a printer 1 in the embodiment. As shown in FIG. 1, the printer 1 includes a carriage 4 on which an ink jet recording head 2 is mounted and an ink cartridge 3 is detachably installed; a platen 5 disposed below the ink jet recording head (ink jet head) 2 and onto which a recording medium 6 is transported; a carriage-moving mechanism 7 for moving the carriage 4 in the medium width direction (main scanning direction S) of the recording medium 6; and a medium-transporting mechanism 8 for transporting the recording medium 6 in the medium-transporting direction. The printer 1 also has a controller CONT that controls the entire operation of the printer 1.

The recording head 2 includes cavities for discharging the non-aqueous composition accommodated therein from nozzles; discharge-driving portions provided to the corresponding cavities and applying driving force for discharge to the non-aqueous composition; and nozzles provided to the corresponding cavities and discharging the non-aqueous composition to the outside of the head. One head may be provided with a plurality of independent cavities and the discharge-driving portions and nozzles provided to the corresponding cavities. The discharge-driving portion can be formed using, for example, an electromechanical transducer, such as a piezoelectric element, that changes the volume of the cavity by mechanical deformation, or an electrothermal transducer that generates heat to form air bubbles in the non-aqueous composition and thereby discharges the non-aqueous composition. The printer 1 may include one head for one non-aqueous composition or may include a plurality of heads for one non-aqueous composition.

The ink cartridge 3 is composed of a plurality of independent cartridges, and each cartridge is filled with the non-aqueous composition. The cartridge filled with the non-aqueous composition may be removed from the carriage 4 during ordinary printing, but should be installed on the carriage 4 at least when the flow channel of the non-aqueous composition is rinsed.

The platen 5 includes a platen heater and is configured so as to heat the recording medium to a preset temperature. The recording head 2 does not have a built-in heater, but the temperature of the recording head is also increased as a result of heating of the recording medium, and thereby the temperature of the non-aqueous composition accommodated in the recording head 2 tends to raise. The printer 1 may include an after-heater (not shown) in the recording medium-transporting path downstream of the platen heater.

The above-described non-aqueous composition of the embodiment is discharged from the recording head 2. Herein, the temperature of the platen when the non-aqueous composition is discharged from the recording head 2 is preferably 35° C. or more and more preferably 40° C. or more, and is preferably 80° C. or less, more preferably 70° C. or less, more preferably 60° C. or less, and most preferably 50° C. or less. The platen heated with a platen heater to a temperature within the above-mentioned range is advantageous to provide higher quality to recorded matters.

In addition, in the embodiment, the frequency of discharge from the recording head 2 is preferably 1.0 kHz or more and 200 kHz or less. A discharge frequency lower than the upper limit of the above-mentioned range is preferred to provide more excellent discharge stability, and a discharge frequency higher than the lower limit of the above-mentioned range is preferred to provide a higher recording speed. The term "discharge frequency" means the frequency of discharging each non-aqueous composition droplet as a discharge unit. The discharge frequency is preferably 2.0 kHz or more, more preferably 3.0 kHz or more, more preferably 5.0 kHz or more, and most preferably 10 kHz or more from the viewpoint of further accelerating the recording speed. In addition, the discharge frequency is preferably 200 kHz or less, more preferably 150 kHz or less, more preferably 100 kHz or less, and most preferably 50 kHz or less from the viewpoint of enhancing the discharge stability. Furthermore, the discharge frequency is preferably 20 kHz or less and more preferably 15 kHz or less from the viewpoint of providing further excellent discharge stability while maintaining the recording speed. At the same time, the discharge frequency is preferably 15 kHz or more and more preferably 20 kHz or more from the viewpoint of providing higher recording speed while maintaining the discharge stability.

As an example of the printer 1 of the embodiment, a so-called on-carriage type printer having the ink cartridge 3 mounted on the carriage 4 was described above, but the printer is not limited thereto. For example, the printer may be of a so-called off-carriage type, where an ink container (such as an ink pack or ink cartridge) filled with the non-aqueous composition is installed on, for example, the housing of the printer 1 and the non-aqueous composition is supplied to the head 2 through an ink supply tube.

The ink jet recording apparatus of the embodiment can employ an ink set including a plurality of non-aqueous compositions. The ink set of the embodiment may include a plurality of the non-aqueous ink jet compositions of the embodiment or may further include one or more non-aqueous compositions (other non-aqueous composition(s)) different from the non-aqueous ink jet compositions of the embodiment. In such a case, the ink set may include a magenta ink of the non-aqueous composition of the embodiment and a yellow ink and a cyan ink of the other non-aqueous compositions. Alternatively, the ink set may include a red ink of the non-aqueous composition of the embodiment and a magenta ink, a yellow ink, and a cyan ink of the other non-aqueous compositions. From the viewpoint of achieving more excellent color reproducibility, the non-aqueous composition of the embodiment is preferably used as a red ink, and the other non-aqueous compositions are preferably used as magenta, yellow, and cyan inks.

EXAMPLES

The first embodiment will now be more specifically described with reference to Examples, Comparative Examples, and Reference Examples, but the embodiment is not limited to the following Examples within the scope of the present invention.

The main materials for the non-aqueous compositions used in Examples, Comparative Examples, and Reference Examples are as follows:

Materials for Non-Aqueous Composition

Pigment

C.I. Pigment Red 254 (PR-254) (manufactured by Tokyo Chemical Industry Co., Ltd., trade name: Pigment Red 254)

C.I. Pigment Red 177 (PR-177) (manufactured by Hangzhou Xcolor Chemical Company, trade name: Pigment Red 177)

C.I. Pigment Red 179 (PR-179) (manufactured by Gaoyou Auxiliary Factory, trade name: Pigment Red 179)

C.I. Pigment Red 224 (PR-224) (manufactured by Hangzhou Xcolor Chemical Company, trade name: Pigment Red 224)

Organic Solvent

Diethylene glycol methyl ethyl ether (manufactured by Nippon Nyukazai Co., Ltd., trade name: MEDG)

Diethylene glycol diethyl ether (manufactured by Nippon Nyukazai Co., Ltd., trade name: DEDG)

Triethylene glycol monobutyl ether (manufactured by Tokyo Chemical Industry Co., Ltd., trade name: Triethylene Glycol Monobutyl Ether)

Tetraethylene glycol monobutyl ether (manufactured by KH Neochem Co., Ltd., trade name: Butycenol 40)

Dipropylene glycol monomethyl ether (manufactured by Tokyo Chemical Industry Co., Ltd., trade name: Dipropylene Glycol Monomethyl Ether)

Gamma-butyrolactone (manufactured by Tokyo Chemical Industry Co., Ltd., trade name: γ-Butyrolactone)

Delta-valerolactone (manufactured by Tokyo Chemical Industry Co., Ltd., trade name: δ-Valerolactone)

Methyl caprylate (manufactured by Tokyo Chemical Industry Co., Ltd., trade name: Methyl n-Octanoate)

Methyl caprate (manufactured by Tokyo Chemical Industry Co., Ltd., trade name: Methyl Decanoate)

3-Methoxybutyl acetate (manufactured by Daicel Corporation, trade name: 3-Methoxybutyl Acetate)

3-Methoxy-3-methyl-1-butyl acetate (manufactured by Kuraray Co., Ltd., trade name: Solfit AC)

Methyl lactate (manufactured by Tokyo Chemical Industry Co., Ltd., trade name: Methyl D-(+)-Lactate)

Ethyl lactate (manufactured by Tokyo Chemical Industry Co., Ltd., trade name: Ethyl L-(−)-Lactate)

Resin

Copolymer resin of vinyl chloride and vinyl acetate (manufactured by Nissin Chemical Co., Ltd., trade name: Solbin CL)

Pigment-Dispersing Agent

Solsperse 37500 (trade name, manufactured by The Lubrizol Corporation)

Surfactant

BYK-340 (trade name, manufactured by BYK Chemie Japan K.K.)

Preparation of Non-Aqueous Composition

Materials shown in Tables 1 and 2 were mixed at the ratios shown in the tables and were sufficiently stirred to give each non-aqueous composition. In Tables 1 and 2, the unit of the numerical values relating to the materials used is mass %, and the total amount is 100 mass %. The amount of dissolved nitrogen in each non-aqueous composition was adjusted to that shown in Table 1 or 2 by the method described in the following paragraph "Physical property 1: Amount of dissolved nitrogen".

Physical Property 1: Amount of Dissolved Nitrogen

A 1-L beaker containing 800 mL of any of the resulting non-aqueous compositions was put in a commercially available vacuum deaerator (deaerator including an acrylic airtight container having a volume of 200×200×300 mm and connected to a vacuum gauge and a vacuum pump) set to a vacuum gauge value of about 0.08 MPa, followed by stirring at a rotation speed of 500 rpm with a 5-cm-long stirrer to adjust the amount of dissolved nitrogen. The amount of dissolved nitrogen in each non-aqueous composition was measured with a gas chromatograph 6890N (trade name, manufactured by Agilent Technologies, Inc.). The results of measurement are shown in Tables 1 and 2. The unit of the numerical values is mass ppm.

TABLE 1

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 |
|---|---|---|---|---|---|---|---|---|---|---|---|---|---|---|---|
| PR-254 | 3.0 | 3.0 | 3.0 | 3.0 | 3.0 | 3.0 | 3.0 | 3.0 | 3.0 | 3.0 | 3.0 | 3.0 | 3.0 | 5.0 | 5.0 |
| PR-177 | — | — | — | — | — | — | — | — | — | — | — | — | — | — | — |
| PR-179 | — | — | — | — | — | — | — | — | — | — | — | — | — | — | — |
| PR-224 | — | — | — | — | — | — | — | — | — | — | — | — | — | — | — |
| Diethylene glycol methyl ethyl ether | 74 | 74 | 74 | — | 74 | 24 | 24 | 24 | 24 | 24 | 24 | 74 | 74 | 72 | 72 |
| Diethylene glycol diethyl ether | — | — | — | 74 | — | — | — | — | — | — | — | — | — | — | — |
| Triethylene glycol monobutyl ether | 10 | — | — | 10 | 10 | 10 | 10 | 10 | 10 | 10 | 10 | 10 | 10 | 10 | — |
| Tetraethylene glycol monobutyl ether | — | 10 | — | — | — | — | — | — | — | — | — | — | — | — | — |
| Dipropylene glycol monomethyl ether | — | — | 10 | — | — | — | — | — | — | — | — | — | — | — | — |
| Gamma-butyrolactone | 10 | 10 | 10 | 10 | — | 10 | 10 | 10 | 10 | 10 | 10 | 10 | 10 | 10 | 10 |
| Delta-valerolactone | — | — | — | — | 10 | — | — | — | — | — | — | — | — | — | — |
| Methyl caprylate | — | — | — | — | — | 50 | — | — | — | — | — | — | — | — | — |
| Methyl caprate | — | — | — | — | — | — | 50 | — | — | — | — | — | — | — | — |
| 3-Methoxybutyl acetate | — | — | — | — | — | — | — | 50 | — | — | — | — | — | — | — |
| 3-Methoxy-3-methyl-1-butyl acetate | — | — | — | — | — | — | — | — | 50 | — | — | — | — | — | — |
| Methyl lactate | — | — | — | — | — | — | — | — | — | 50 | — | — | — | — | — |
| Ethyl lactate | — | — | — | — | — | — | — | — | — | — | 50 | — | — | — | — |
| Solsperse 37500 | 1.9 | 1.9 | 1.9 | 1.9 | 1.9 | 1.9 | 1.9 | 1.9 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Amount of dissolved nitrogen [ppm] | 50 | 50 | 50 | 50 | 50 | 50 | 50 | 50 | 50 | 50 | 50 | 90 | 20 | 20 | 50 |
| Discharge stability | 4 | 4 | 4 | 4 | 4 | 4 | 4 | 3 | 3 | 4 | 4 | 3 | 4 | 3 | 3 |
| Intensity | 4 | 4 | 3 | 3 | 3 | 3 | 3 | 4 | 4 | 3 | 3 | 3 | 4 | 4 | 4 |
| Manufacturing cost | 3 | 3 | 3 | 3 | 3 | 3 | 3 | 3 | 3 | 3 | 3 | 4 | 2 | 2 | 3 |

TABLE 2

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| PR-254 | — | — | — | — | — | — | — |
| PR-177 | 3.0 | — | — | 5.0 | — | — | — |
| PR-179 | — | 3.0 | — | — | 6.0 | — | 6.0 |
| PR-224 | — | — | 3.0 | — | — | 5.0 | — |
| Diethylene glycol methyl ethyl ether | 74 | 74 | 74 | 72 | 71 | 72 | 71 |
| Diethylene glycol diethyl ether | — | — | — | — | — | — | — |
| Triethylene glycol monobutyl ether | 10 | 10 | 10 | 10 | 10 | 10 | 10 |
| Tetraethylene glycol monobutyl ether | — | — | — | — | — | — | — |
| Dipropylene glycol monomethyl ether | — | — | — | — | — | — | — |
| Gamma-butyrolactone | 10 | 10 | 10 | 10 | 10 | 10 | 10 |
| Delta-valerolactone | — | — | — | — | — | — | — |
| Methyl caprylate | — | — | — | — | — | — | — |
| Methyl caprate | — | — | — | — | — | — | — |
| 3-Methoxybutyl acetate | — | — | — | — | — | — | — |
| 3-Methoxy-3-methyl-1-butyl acetate | — | — | — | — | — | — | — |
| Methyl lactate | — | — | — | — | — | — | — |
| Ethyl lactate | — | — | — | — | — | — | — |
| Solsperse 37500 | 1.9 | 1.9 | 1.9 | 1.9 | 1.9 | 1.9 | 1.9 |
| BYK-340 | 0.1 | 0.1 | 0.1 | 0.1 | 0.1 | 0.1 | 0.1 |
| Solbin CL | 1.0 | 1.0 | 1.0 | 1.0 | 1.0 | 1.0 | 1.0 |
| Amount of dissolved nitrogen [ppm] | 50 | 50 | 50 | 50 | 50 | 50 | 10 |
| Discharge stability | 3 | 3 | 3 | 2 | 1 | 2 | 2 |
| Intensity | 2 | 1 | 2 | 3 | 3 | 3 | 3 |
| Manufacturing cost | 2 | 2 | 2 | 2 | 2 | 2 | 1 |

| | Comparative Example 8 | Reference Example 1 | Reference Example 2 | Reference Example 3 | Comparative Example 9 | Comparative Example 10 |
|---|---|---|---|---|---|---|
| PR-254 | — | 3.0 | — | — | 3.0 | — | — |
| PR-177 | — | — | 5.0 | — | — | 3.0 | 3.0 |
| PR-179 | — | — | — | — | — | — | — |
| PR-224 | — | — | — | 5.0 | — | — | — |
| Diethylene glycol methyl ethyl ether | 74 | 72 | 72 | 74 | 74 | 74 |
| Diethylene glycol diethyl ether | — | — | — | — | — | — |

TABLE 2-continued

| | | | | | | |
|---|---|---|---|---|---|---|
| Triethylene glycol monobutyl ether | 10 | 10 | 10 | 10 | 10 | 10 |
| Tetraethylene glycol monobutyl ether | — | — | — | — | — | — |
| Dipropylene glycol monomethyl ether | — | — | — | — | — | — |
| Gamma-butyrolactone | 10 | 10 | 10 | 10 | 10 | 10 |
| Delta-valerolactone | — | — | — | — | — | — |
| Methyl caprylate | — | — | — | — | — | — |
| Methyl caprate | — | — | — | — | — | — |
| 3-Methoxybutyl acetate | — | — | — | — | — | — |
| 3-Methoxy-3-methyl-1-butyl acetate | — | — | — | — | — | — |
| Methyl lactate | — | — | — | — | — | — |
| Ethyl lactate | — | — | — | — | — | — |
| Solsperse 37500 | 1.9 | 1.9 | 1.9 | 1.9 | 1.9 | 1.9 |
| BYK-340 | 0.1 | 0.1 | 0.1 | 0.1 | 0.1 | 0.1 |
| Solbin CL | 1.0 | 1.0 | 1.0 | 1 | 1 | 1.0 |
| Amount of dissolved nitrogen [ppm] | 100 | 10 | 10 | 10 | 10 | 20 |
| Discharge stability | 1 | 3 | 3 | 4 | 3 | 3 |
| Intensity | 2 | 3 | 3 | 4 | 2 | 2 |
| Manufacturing cost | 4 | 1 | 1 | 1 | 1 | 1 |

Formation of Recorded Matter

A PVC medium (manufactured by 3M Company, Model No. IJ180-10) as a recording medium was placed in an ink jet printer (manufactured by Seiko Epson Corporation, trade name: SC-530650); any of the compositions prepared in Examples, Comparative Examples, and Reference Examples was loaded into the discharge head; the temperature of the platen was maintained at 45° C. during the formation of a recorded matter and for 1 minute after the formation of the recorded matter; and a solid pattern was formed at an application amount of 10 mg/inch$^2$ and a target resolution of 720×720 dpi to give each recorded matter. Even if an insufficient discharge part was caused by a discharge defect, the defective portion was not compensated.

Evaluation 1: Discharge Stability

Any of the non-aqueous compositions prepared in Examples, Comparative Examples, and Reference Examples was loaded on an ink jet printer (manufactured by Seiko Epson Corporation, trade name: SC-530650) and was then discharged from an ink jet head having 360 nozzles at a frequency of 7 kHz to continuously form solid patterns (L dot, 600×600 dpi) for 300 seconds on a PVC medium (manufactured by 3M Company, Model No. IJ180-10) as a recording medium, and the discharge was then stopped. This procedure was defined as one sequence. Subsequently, the procedure was repeated ten sequences. The thus-prepared solid patterns as recorded matters were investigated for dot omission, curved flight, and scattering of the ink. The nozzle having any of these phenomena was defined as a defective nozzle, and the ratio of the number of defective nozzles to the total number of the nozzles (360 nozzles) was counted to evaluate discharge stability. The results are shown in Tables 1 and 2.

Evaluation Criteria

4: defective nozzle rate of 0%,
3: defective nozzle rate of higher than 0% and less than 5%,
2: defective nozzle rate of 5% or more and less than 10%, and
1: defective nozzle rate of 10% or more.

Evaluation 2: Image Quality (Intensity)

The intensity (C*) of each of the resulting recorded matters was evaluated. Specifically, the value a* and the value b* of each recorded matter were measured with a spectrophotometer (manufactured by GretagMacbeth, trade name: Spectrolino), and the value C* was calculated. The intensity was evaluated based on the following evaluation criteria. The calculated value C* was rounded off to the nearest whole number. The results are shown in Tables 1 and 2.

Evaluation Criteria

4: value C* of 100 or more,
3: value C* of 90 to 99,
2: value C* of 80 to 89, and
1: value C* of 79 or less.

Evaluation 3: Manufacturing Cost

The manufacturing cost was evaluated from the deaeration time in adjustment of the amount of dissolved nitrogen in each non-aqueous composition based on the following evaluation criteria. The results are shown in Tables 1 and 2. Herein, the term "deaeration time" refers to the time from the putting of each non-aqueous composition in the vacuum deaerator to the collecting of the composition.

Evaluation Criteria

4: deaeration time of less than 10 minutes,
3: deaeration time of 10 minutes or more and less than 20 minutes,
2: deaeration time of 20 minutes or more and less than 30 minutes, and
1: deaeration time of 30 minutes or more.

The comparison among the results of Examples, Comparative Examples, and Reference Examples shown in Tables and 2 demonstrated that the non-aqueous ink jet compositions according to the present invention can form recorded matters having excellent intensity, that the non-aqueous ink jet compositions also have excellent discharge stability, and that the non-aqueous ink jet composition is also excellent in manufacturing cost.

The second embodiment will now be more specifically described with reference to Examples, Comparative Examples, and Reference Examples, but the embodiment is not limited to the following Examples within the scope of the present invention.

The main materials for the non-aqueous compositions used in Examples, Comparative Examples, and Reference Examples are as follows:

Materials for Non-Aqueous Composition
Pigment
C.I. Pigment Red 254 (PR-254, average particle diameter: 170 nm) (manufactured by Tokyo Chemical Industry Co., Ltd., trade name: Pigment Red 254)
C.I. Pigment Red 177 (PR-177, average particle diameter: 175 nm)
C.I. Pigment Red 179 (PR-179, average particle diameter: 183 nm)
C.I. Pigment Red 224 (PR-224, average particle diameter: 168 nm)
Organic Solvent
Diethylene glycol methyl ethyl ether (manufactured by Hangzhou Xcolor Chemical Company, trade name: Pigment Red 177)
Diethylene glycol diethyl ether (manufactured by Nippon Nyukazai Co., Ltd., trade name: DEDG)
Tetraethylene glycol dimethyl ether (manufactured by Tokyo Chemical Industry Co., Ltd., trade name: Tetraethylene Glycol Dimethyl Ether)
Triethylene glycol monobutyl ether (manufactured by Tokyo Chemical Industry Co., Ltd., trade name: Triethylene Glycol Monobutyl Ether)
Tetraethylene glycol monobutyl ether (manufactured by KH Neochem Co., Ltd., trade name: Butycenol 40)
Dipropylene glycol monomethyl ether (manufactured by Tokyo Chemical Industry Co., Ltd., trade name: Dipropylene Glycol Monomethyl Ether)
Ethylene glycol monobutyl ether (manufactured by Tokyo Chemical Industry Co., Ltd., trade name: Ethylene Glycol Monobutyl Ether)
Gamma-butyrolactone (manufactured by Tokyo Chemical Industry Co., Ltd., trade name: γ-Butyrolactone)
Delta-valerolactone (manufactured by Tokyo Chemical Industry Co., Ltd., trade name: δ-Valerolactone)
Resin
Copolymer resin of vinyl chloride and vinyl acetate (manufactured by Nissin Chemical Co., Ltd., trade name: Solbin CL)

Pigment-Dispersing Agent
Solsperse 37500 (trade name, manufactured by The Lubrizol Corporation)
Surfactant
BYK-340 (trade name, manufactured by BYK Chemie Japan K.K.)
Preparation of Pigment Dispersion
Pigment Red 254 (PR-254) having a primary particle diameter of 170 nm was prepared as a pigment. Subsequently, Solsperse 37500 (trade name, manufactured by The Lubrizol Corporation) was added to the pigment as a dispersant with a change by changing the amount of the dispersant in a range of 0.1 to 20 mass % based on the pigment to prepare dispersions having desired volume average particle diameters. In an ink composition, the solvent of which the amount was the largest was defined as the dispersion medium of the pigment dispersion. PR-254 having a volume average particle diameter smaller than the primary particle diameter was pulverized with a ball mill into PR-254 having a desired volume average particle diameter.

The volume average particle diameter of a pigment was measured by diluting the resulting pigment dispersion with diethylene glycol diethyl ether to 1000 ppm or less and reading the value of the volume average particle diameter (median diameter D50) measured by a laser diffraction scattering method (with Microtrac UPA250 manufactured by Nikkiso Co., Ltd.) under an environment of 20° C. As a result, C.I. Pigment Red 254 pigments having average particle diameters of 50 nm, 85 nm, 103 nm, 238 nm, 252 nm, and 310 nm were prepared.
Preparation of Non-Aqueous Composition
Materials shown in Tables 3 and 4 were mixed at the compositional ratios shown in the tables and were sufficiently stirred to prepare each composition. In Tables 3 and 4, the unit of the numerical values is mass %, and the total amount is 100.0 mass %.

TABLE 3

|  | Example 1 | Example 2 | Example 3 | Example 4 | Example 5 | Example 6 |
| --- | --- | --- | --- | --- | --- | --- |
| PR-254 particle diameter: 50 nm | — | — | — | — | — | — |
| PR-254 particle diameter: 85 nm | — | — | — | — | — | — |
| PR-254 particle diameter: 103 nm | — | 3.0 | — | 1.5 | — | — |
| PR-254 particle diameter: 170 nm | 3.0 | — | — | — | 1.0 | 4.5 |
| PR-254 particle diameter: 238 nm | — | — | 3.0 | 1.5 | — | — |
| PR-254 particle diameter: 252 nm | — | — | — | — | — | — |
| PR-254 particle diameter: 310 nm | — | — | — | — | — | — |
| PR-177 particle diameter: 175 nm | — | — | — | — | — | — |
| PR-179 particle diameter: 183 nm | — | — | — | — | — | — |
| PR-224 particle diameter: 168 nm | — | — | — | — | — | — |
| Diethylene glycol methyl ethyl ether (flash point: 64° C.) | 50 | 50 | 50 | 50 | 52 | 48.5 |
| Diethylene glycol diethyl ether (flash point: 71° C.) | — | — | — | — | — | — |
| Tetraethylene glycol dimethyl ether (flash point: 141° C.) | — | — | — | — | — | — |
| Triethylene glycol monobutyl ether (flash point: 143° C.) | 34 | 34 | 34 | 34 | 34 | 34 |
| Tetraethylene glycol monobutyl ether | — | — | — | — | — | — |
| Dipropylene glycol monomethyl ether (flash point: 79° C.) | — | — | — | — | — | — |
| Ethylene glycol monobutyl ether (flash point: 62° C.) | — | — | — | — | — | — |
| Gamma-butyrolactone | 10 | 10 | 10 | 10 | 10 | 10 |
| Delta-valerolactone | — | — | — | — | — | — |
| Solsperse 37500 | 1.9 | 1.9 | 1.9 | 1.9 | 1.9 | 1.9 |
| BYK-340 | 0.1 | 0.1 | 0.1 | 0.1 | 0.1 | 0.1 |
| Solbin CL | 1 | 1 | 1 | 1 | 1 | 1 |
| Discharge stability | 4 | 4 | 3 | 4 | 4 | 4 |
| Intensity | 4 | 3 | 5 | 4 | 3 | 4 |
| Weather resistance | 4 | 3 | 4 | 4 | 3 | 4 |
| Abrasion resistance | 4 | 4 | 4 | 4 | 4 | 3 |

TABLE 3-continued

|  | Example 7 | Example 8 | Example 9 | Example 10 | Example 11 |
|---|---|---|---|---|---|
| PR-254 particle diameter: 50 nm | — | — | — | — | — |
| PR-254 particle diameter: 85 nm | — | — | — | — | — |
| PR-254 particle diameter: 103 nm | — | — | — | — | — |
| PR-254 particle diameter: 170 nm | 10 | 3.0 | 3.0 | 3.0 | 3.0 |
| PR-254 particle diameter: 238 nm | — | — | — | — | — |
| PR-254 particle diameter: 252 nm | — | — | — | — | — |
| PR-254 particle diameter: 310 nm | — | — | — | — | — |
| PR-177 particle diameter: 175 nm | — | — | — | — | — |
| PR-179 particle diameter: 183 nm | — | — | — | — | — |
| PR-224 particle diameter: 168 nm | — | — | — | — | — |
| Diethylene glycol methyl ethyl ether (flash point: 64° C.) | 43 | — | — | 50 | 50 |
| Diethylene glycol diethyl ether (flash point: 71° C.) | — | 50 | — | — | — |
| Tetraethylene glycol dimethyl ether (flash point: 141° C.) | — | — | 50 | — | — |
| Triethylene glycol monobutyl ether (flash point: 143° C.) | 34 | 34 | 34 | — | — |
| Tetraethylene glycol monobutyl ether | — | — | — | 34 | — |
| Dipropylene glycol monomethyl ether (flash point: 79° C.) | — | — | — | — | 34 |
| Ethylene glycol monobutyl ether (flash point: 62° C.) | — | — | — | — | — |
| Gamma-butyrolactone | 10 | 10 | 10 | 10 | 10 |
| Delta-valerolactone | — | — | — | — | — |
| Solsperse 37500 | 1.9 | 1.9 | 1.9 | 1.9 | 1.9 |
| BYK-340 | 0.1 | 0.1 | 0.1 | 0.1 | 0.1 |
| Solbin CL | 1 | 1 | 1 | 1 | 1 |
| Discharge stability | 3 | 4 | 3 | 4 | 4 |
| Intensity | 5 | 5 | 5 | 4 | 4 |
| Weather resistance | 4 | 4 | 3 | 4 | 4 |
| Abrasion resistance | 2 | 3 | 3 | 4 | 4 |

TABLE 4

|  | Example 12 | Example 13 | Example 14 | Example 15 | Comparative Example 1 | Comparative Example 2 |
|---|---|---|---|---|---|---|
| PR-254 particle diameter: 50 nm | — | — | — | — | 3.0 | — |
| PR-254 particle diameter: 85 nm | — | — | — | — | — | 3.0 |
| PR-254 particle diameter: 103 nm | — | — | — | — | — | — |
| PR-254 particle diameter: 170 nm | 3.0 | 3.0 | 3.0 | 3.0 | — | — |
| PR-254 particle diameter: 238 nm | — | — | — | — | — | — |
| PR-254 particle diameter: 252 nm | — | — | — | — | — | — |
| PR-254 particle diameter: 310 nm | — | — | — | — | — | — |
| PR-177 particle diameter: 175 nm | — | — | — | — | — | — |
| PR-179 particle diameter: 183 nm | — | — | — | — | — | — |
| PR-224 particle diameter: 168 nm | — | — | — | — | — | — |
| Diethylene glycol methyl ethyl ether (flash point: 64° C.) | 50 | 50 | 34 | 84 | 50 | 50 |
| Diethylene glycol diethyl ether (flash point: 71° C.) | — | — | — | — | — | — |
| Tetraethylene glycol dimethyl ether (flash point: 141° C.) | — | — | — | — | — | — |
| Triethylene glycol monobutyl ether (flash point: 143° C.) | — | 34 | 50 | — | 34 | 34 |
| Tetraethylene glycol monobutyl ether | — | — | — | — | — | — |
| Dipropylene glycol monomethyl ether (flash point: 79° C.) | — | — | — | — | — | — |
| Ethylene glycol monobutyl ether (flash point: 62° C.) | 34 | — | — | — | — | — |
| Gamma-butyrolactone | 10 | — | 10 | 10 | 10 | 10 |
| Delta-valerolactone | — | 10 | — | — | — | — |
| Solsperse 37500 | 1.9 | 1.9 | 1.9 | 1.9 | 1.9 | 1.9 |
| BYK-340 | 0.1 | 0.1 | 0.1 | 0.1 | 0.1 | 0.1 |
| Solbin CL | 1 | 1 | 1 | 1 | 1 | 1 |
| Discharge stability | 4 | 4 | 3 | 4 | 4 | 4 |
| Intensity | 4 | 4 | 3 | 3 | 1 | 2 |
| Weather resistance | 4 | 4 | 4 | 4 | 1 | 2 |
| Abrasion resistance | 4 | 4 | 3 | 4 | 4 | 4 |

|  | Comparative Example 3 | Comparative Example 4 | Comparative Example 5 | Comparative Example 6 | Comparative Example 7 |
|---|---|---|---|---|---|
| PR-254 particle diameter: 50 nm | — | — | — | — | — |
| PR-254 particle diameter: 85 nm | — | — | — | — | — |
| PR-254 particle diameter: 103 nm | — | — | — | — | — |
| PR-254 particle diameter: 170 nm | — | — | — | — | — |
| PR-254 particle diameter: 238 nm | — | — | — | — | — |
| PR-254 particle diameter: 252 nm | 3.0 | — | — | — | — |
| PR-254 particle diameter: 310 nm | — | 3.0 | — | — | — |
| PR-177 particle diameter: 175 nm | — | — | 3.0 | — | — |
| PR-179 particle diameter: 183 nm | — | — | — | 3.0 | — |
| PR-224 particle diameter: 168 nm | — | — | — | — | 3.0 |
| Diethylene glycol methyl ethyl ether (flash point: 64° C.) | 50 | 50 | 50 | 50 | 50 |

TABLE 4-continued

| | | | | | |
|---|---|---|---|---|---|
| Diethylene glycol diethyl ether (flash point: 71° C.) | — | — | — | — | — |
| Tetraethylene glycol dimethyl ether (flash point: 141° C.) | — | — | — | — | — |
| Triethylene glycol monobutyl ether (flash point: 143° C.) | 34 | 34 | 34 | 34 | 34 |
| Tetraethylene glycol monobutyl ether | — | — | — | — | — |
| Dipropylene glycol monomethyl ether (flash point: 79° C.) | — | — | — | — | — |
| Ethylene glycol monobutyl ether (flash point: 62° C.) | — | — | — | — | — |
| Gamma-butyrolactone | 10 | 10 | 10 | 10 | 10 |
| Delta-valerolactone | — | — | — | — | — |
| Solsperse 37500 | 1.9 | 1.9 | 1.9 | 1.9 | 1.9 |
| BYK-340 | 0.1 | 0.1 | 0.1 | 0.1 | 0.1 |
| Solbin CL | 1 | 1 | 1 | 1 | 1 |
| Discharge stability | 2 | 1 | 4 | 4 | 4 |
| Intensity | 5 | 5 | 2 | 1 | 2 |
| Weather resistance | 4 | 4 | 4 | 4 | 4 |
| Abrasion resistance | 4 | 4 | 4 | 4 | 4 |

Formation of Recorded Matter

A PVC medium (manufactured by 3M Company, Model No. IJ180-10) as a recording medium was placed in an ink jet printer (manufactured by Seiko Epson Corporation, trade name: SC-530650); any of the compositions prepared in Examples, Comparative Examples, and Reference Examples was loaded into the discharge head; the temperature of the platen was maintained at 45° C. during the formation of a recorded matter and for 1 minute after the formation of the recorded matter; and a solid pattern was formed at an application amount of 10 mg/inch$^2$ and a target resolution of 720×720 dpi to give each recorded matter. Even if an insufficient discharge part was caused by a discharge defect, the defective portion was not compensated.

Evaluation 1: Discharge Stability

Any of the compositions prepared in Examples, Comparative Examples, and Reference Examples was loaded on an ink jet printer (manufactured by Seiko Epson Corporation, trade name: SC-530650) and was then discharged from an ink jet head having 360 nozzles at a frequency of 7 kHz to continuously form solid patterns (L dot, 600×600 dpi) for 300 seconds on a PVC medium (manufactured by 3M Company, Model No. IJ180-10) as a recording medium, and the discharge was then stopped. This procedure was defined as one sequence. Subsequently, the procedure was repeated ten sequences. The thus-prepared solid patterns as recorded matters were investigated for dot omission, curved flight, and scattering of the ink. The nozzle having any of these phenomena was defined as a defective nozzle, and the rate of defective nozzles to the total nozzles was counted to evaluate discharge stability. The results are shown in Tables 3 and 4.

Evaluation Criteria

4: the number of defective nozzles is zero,

3: the number of defective nozzles is one or two,

2: the number of defective nozzles is three or four, and

1: the number of defective nozzles is five or more.

Evaluation 2: Intensity

The intensity (C*) of each of the resulting recorded matters was evaluated. Specifically, the value a* and the value b* of each recorded matter were measured with a spectrophotometer (manufactured by GretagMacbeth, trade name: Spectrolino), and the value C* was calculated. The intensity was evaluated based on the following evaluation criteria. The calculated value C* was rounded off to the nearest whole number. The results are shown in Tables 3 and 4.

Evaluation Criteria

5: value C* of 110 or more,

4: value C* of 100 to 109,

3: value C* of 90 to 99,

2: value C* of 80 to 89, and

1: value C* of 79 or less.

Evaluation 3: Weather Resistance

Recorded matters were formed using the compositions prepared in Examples, Comparative Examples, and Reference Examples as in the above except that the Duty was adjusted such that the initial OD value measured with a Gretag densitometer (manufactured by GretagMacbeth) was 0.5, 1.0, or the maximum. The resulting recorded matters were placed in the chamber of a xenon weather meter (manufactured by Suga Test Instruments Co., Ltd.) and were subjected to a cycle test repeating a cycle consisting of light irradiation for 40 minutes, light irradiation and waterfall (rainfall) for 20 minutes, light irradiation for 60 minutes, and waterfall (rainfall) for 60 minutes in this order under the test conditions shown in Table 5. This cycle test was continued for 4 weeks, and the recorded matters were taken out after 4 weeks. The OD values of the recorded matters were measured with a Gretag densitometer (manufactured by GretagMacbeth) to determine the survival rate (%) of the OD value. Among the recorded matters of which the initial OD values adjusted to 0.5, 1.0, and the maximum, the recorded matter having the lowest survival rate was used as the subject for evaluation of weather resistance based on the following evaluation criteria. The results are shown in Tables 3 and 4.

Evaluation Criteria

4: OD value survival rate of 90% or more

3: OD value survival rate of 80% or more and less than 90%

2: OD value survival rate of 70% or more and less than 80%, and

1: OD value survival rate of less than 70%

TABLE 5

| Cycle segment | Time (min) | Irradiation intensity 340 nm (W/m²) | Irradiation intensity 300-400 nm (W/m²) | BPT (° C.) | In-tank temperature (° C.) | Relative humidity (%) | Pure water spray |
|---|---|---|---|---|---|---|---|
| 1 | 40 | 0.55 ± 0.02 | 60 ± 2 | 63 ± 2 | 40 ± 2 | 50 ± 6 | None |
| 2 | 20 | 0.55 ± 0.02 | 60 ± 2 | 63 ± 2 | 40 ± 2 | — | Front |
| 3 | 60 | 0.55 ± 0.02 | 60 ± 2 | 63 ± 2 | 40 ± 2 | 50 ± 6 | None |
| 4 | 60 | 0 | 0 | 38 ± 2 | 38 ± 2 | — | Front |

Evaluation 4: Abrasion Resistance

Each of the resulting recorded matters was rubbed with an abrader having a cotton cloth (unbleached muslin: No. 20) under a load of 500 g with a Gakushin-type rubbing fastness tester (manufactured by Tester Sangyo Co., Ltd., trade name: AB-301) for 20 times in a reciprocating motion in accordance with JIS K5701 (ISO 11628). Abrasion resistance was evaluated by visually observing the recorded matter on the recording medium for scratch and detachment based on the following evaluation criteria. The results are shown in Tables 3 and 4.

Evaluation Criteria

4: No scratch and no detachment were observed in the recorded matter after the rubbing for 20 times in a reciprocating motion;

3: No detachment was observed in the recorded matter after rubbing for 20 times in a reciprocating motion, but scratch was observed;

2: Detachment and scratch were partially observed in the recorded matter after rubbing for 20 times in a reciprocating motion; and 1: Detachment was observed in the recorded matter over a part after rubbing for 20 times in a reciprocating motion.

The comparison among the results of Examples, Comparative Examples, and Reference Examples shown in Tables and 4 demonstrated that the non-aqueous ink jet compositions according to the present invention can form recorded matters having excellent intensity, weather resistance, and abrasion resistance and that the non-aqueous ink jet compositions also have excellent discharge stability.

What is claimed is:

1. A non-aqueous ink jet composition comprising:
   a pigment component containing a diketopyrrolopyrrole pigment; and
   an organic solvent, wherein
   the organic solvent contains a glycol ether; and
   the pigment component has an average particle diameter of 100 nm or more and 240 nm or less, and
   the organic solvent contains a glycol diether represented by Formula (1) and a glycol monoether represented by Formula (2):

$$R^1O—(R^3O)_m—R^2 \tag{1}$$

where, $R^1$ and $R^2$ each independently represent an alkyl group having 1 to 7 carbon atoms, $R^3$ represents an alkylene group having 1 to 3 carbon atoms, and m represents an integer of 1 to 7, $$OH—(R^5O)_n—R^4 \tag{2}$$

where, $R^4$ represents an alkyl group having 1 to 7 carbon atoms, $R^5$ represents an alkylene group having 1 to 3 carbon atoms, and n represents an integer of 1 to 7.

2. The non-aqueous ink jet composition according to claim 1, wherein the diketopyrrolopyrrole pigment is a diketopyrrolopyrrole red pigment.

3. The non-aqueous ink jet composition according to claim 1, wherein the amount of the pigment component is 1.0 mass % or more and 5.0 mass % or less based on the total amount of the non-aqueous ink jet composition.

4. The non-aqueous ink jet composition according to claim 1, wherein the total amount of the glycol diether and the glycol monoether is 10 mass % or more and 90 mass % or less based on the total amount of the non-aqueous ink jet composition.

5. The non-aqueous ink jet composition according to claim 1, wherein the organic solvent further contains a cyclic lactone.

6. The non-aqueous ink jet composition according to claim 1, further comprising a vinyl chloride resin.

7. An ink jet recording method comprising:
   performing recording on a recording medium by an ink jet method using the non-aqueous ink jet composition according to claim 1.

* * * * *